(12) United States Patent
Byun et al.

(10) Patent No.: US 12,510,377 B2
(45) Date of Patent: Dec. 30, 2025

(54) SENSING DEVICE

(71) Applicant: LG INNOTEK CO., LTD., Seoul (KR)

(72) Inventors: Sung Wook Byun, Seoul (KR); Tae San Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 93 days.

(21) Appl. No.: 18/039,541

(22) PCT Filed: Dec. 1, 2021

(86) PCT No.: PCT/KR2021/017977
§ 371 (c)(1),
(2) Date: May 31, 2023

(87) PCT Pub. No.: WO2022/119305
PCT Pub. Date: Jun. 9, 2022

(65) Prior Publication Data
US 2023/0417576 A1  Dec. 28, 2023

(30) Foreign Application Priority Data

Dec. 1, 2020 (KR) .................. 10-2020-0165661
Apr. 30, 2021 (KR) .................. 10-2021-0056339

(51) Int. Cl.
*G01D 5/14* (2006.01)
*B62D 15/02* (2006.01)
*G01D 5/20* (2006.01)

(52) U.S. Cl.
CPC .......... *G01D 5/145* (2013.01); *B62D 15/0225* (2013.01); *G01D 5/2013* (2013.01)

(58) Field of Classification Search
CPC ... G01D 5/145; G01D 5/2013; B62D 15/0225
See application file for complete search history.

(56) References Cited

U.S. PATENT DOCUMENTS

| | | | |
|---|---|---|---|
| 4,841,246 | A | 6/1989 | Juds et al. |
| 6,160,395 | A | 12/2000 | Goetz et al. |

(Continued)

FOREIGN PATENT DOCUMENTS

| | | |
|---|---|---|
| CN | 106794868 | 5/2017 |
| JP | 2003-004511 | 1/2003 |

(Continued)

OTHER PUBLICATIONS

International Search Report dated Mar. 2, 2022 issued in Application No. PCT/KR2021/017977.

(Continued)

*Primary Examiner* — Reena Aurora
(74) *Attorney, Agent, or Firm* — KED & ASSOCIATES

(57) ABSTRACT

An embodiment provides a sensing device comprising: a magnet; a collector arranged to correspond to a path along which the magnet moves; and a first sensor disposed in the collector, wherein: the collector comprises a first leg part, a second leg part, and a third leg part; the magnet includes a first pole and a second pole; the first leg part and the second leg part are arranged to be opposite to the first pole; and the third leg part is arranged to be opposite to the second pole.

20 Claims, 37 Drawing Sheets

(56) References Cited

U.S. PATENT DOCUMENTS

| | | | | |
|---|---|---|---|---|
| 6,653,830 B2* | 11/2003 | Luetzow | ................ | G01D 5/145 |
| | | | | 324/207.21 |
| 10,630,133 B2* | 4/2020 | Takizawa | ................ | H02K 5/15 |
| 2004/0164727 A1 | 8/2004 | Lin | | |
| 2014/0197818 A1 | 7/2014 | Stanley | | |
| 2016/0016607 A1* | 1/2016 | Yoshida | ............... | B62D 5/0421 |
| | | | | 324/207.2 |

FOREIGN PATENT DOCUMENTS

| | | |
|---|---|---|
| KR | 10-2004-0085162 | 10/2004 |
| KR | 10-0976701 | 8/2010 |

OTHER PUBLICATIONS

Chinese Office Action issued in Application No. 202180081133.4 dated Jun. 18, 2025.

* cited by examiner

[FIG. 1]
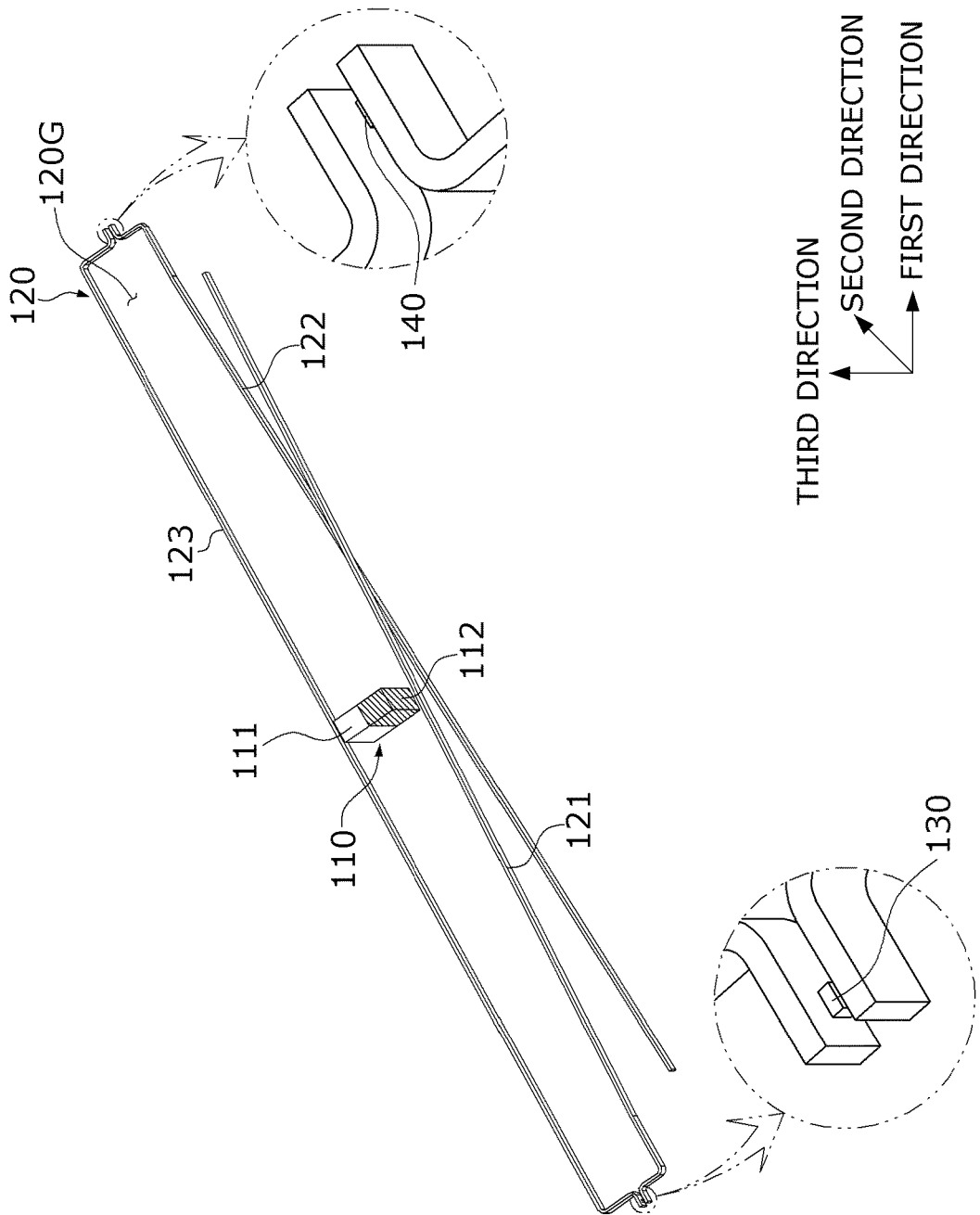

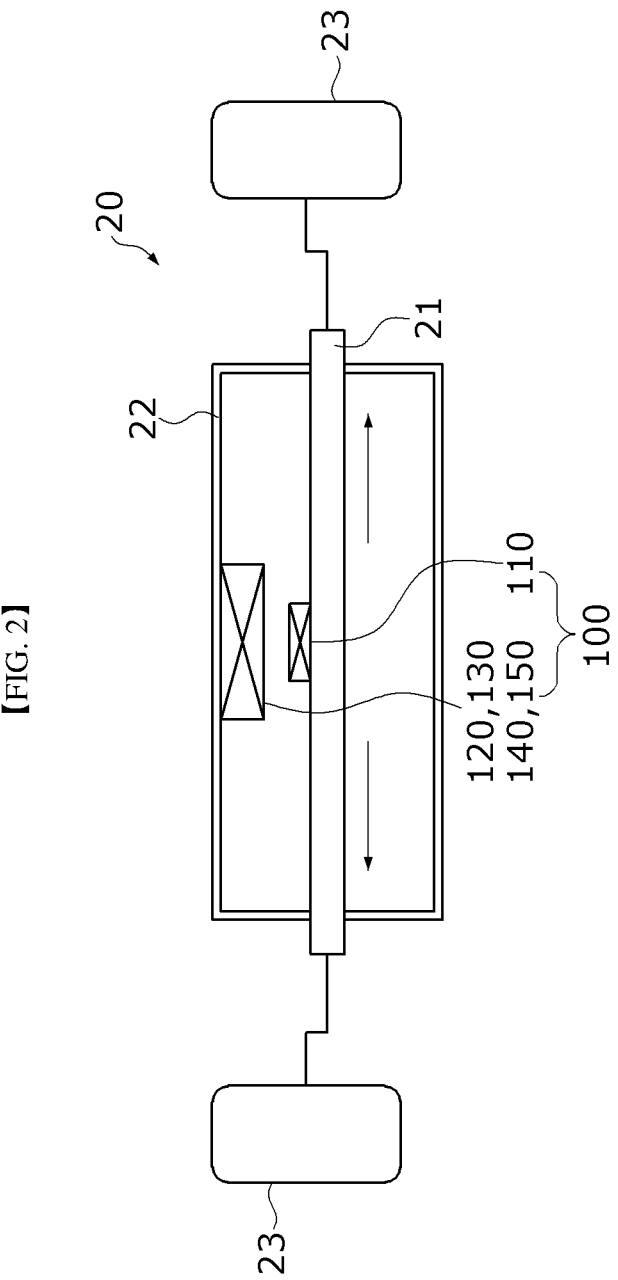
[FIG. 2]

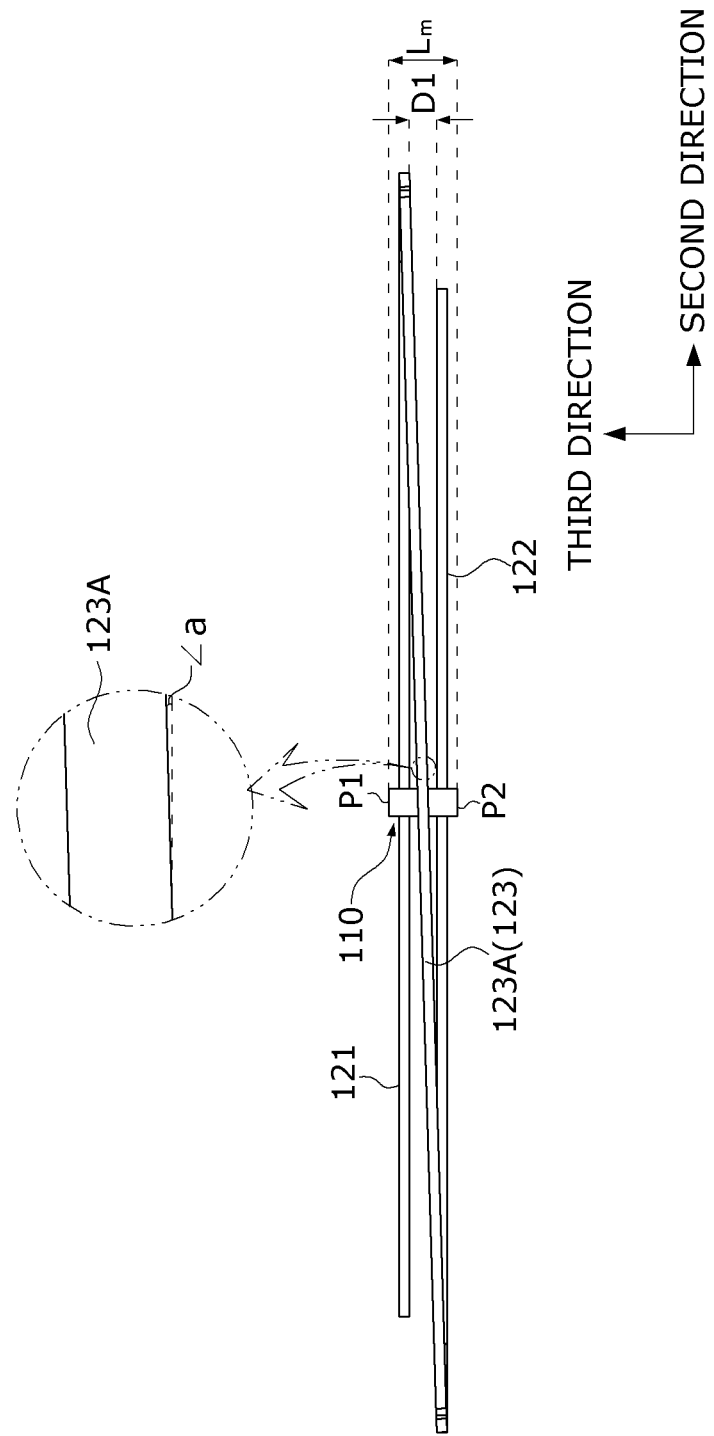

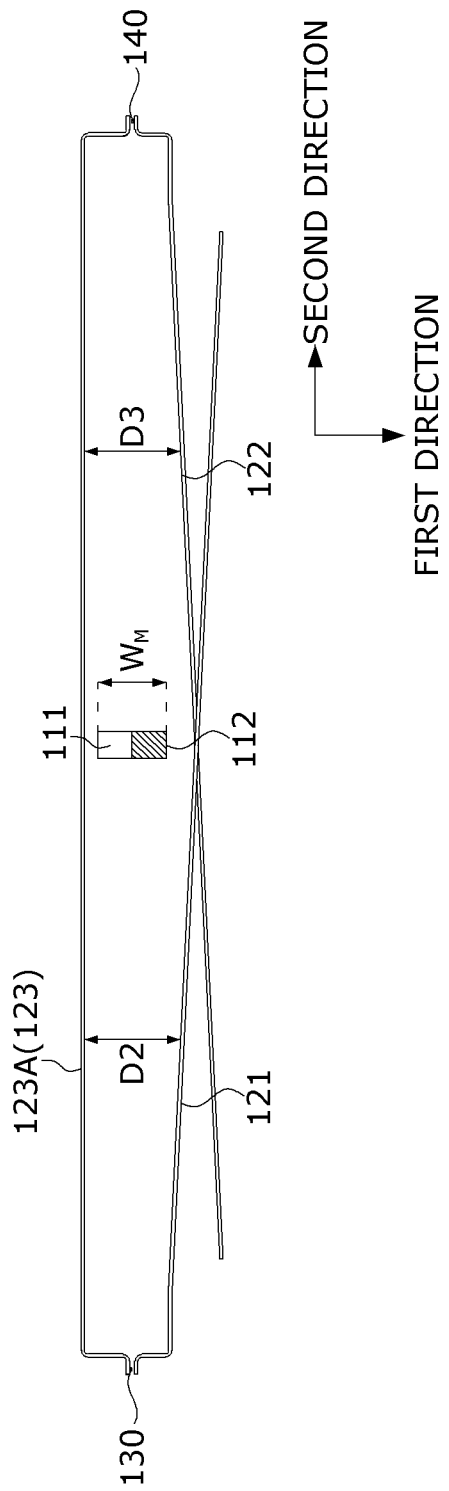
[FIG. 4]

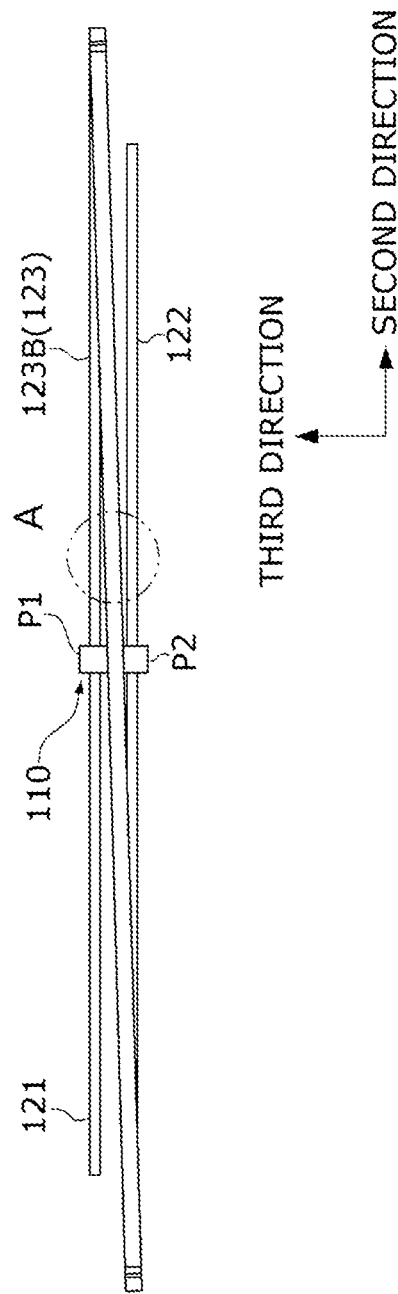

[FIG. 6]
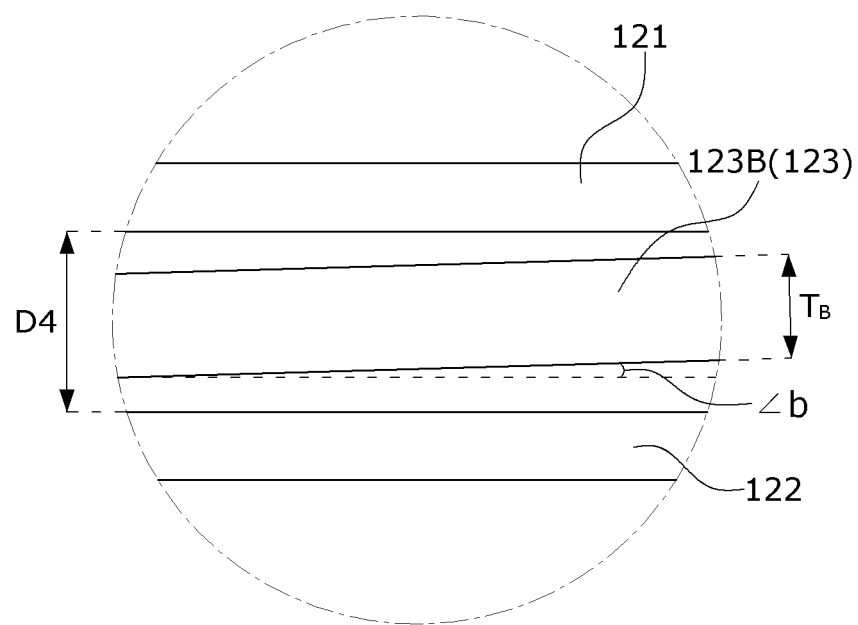

[FIG. 7]
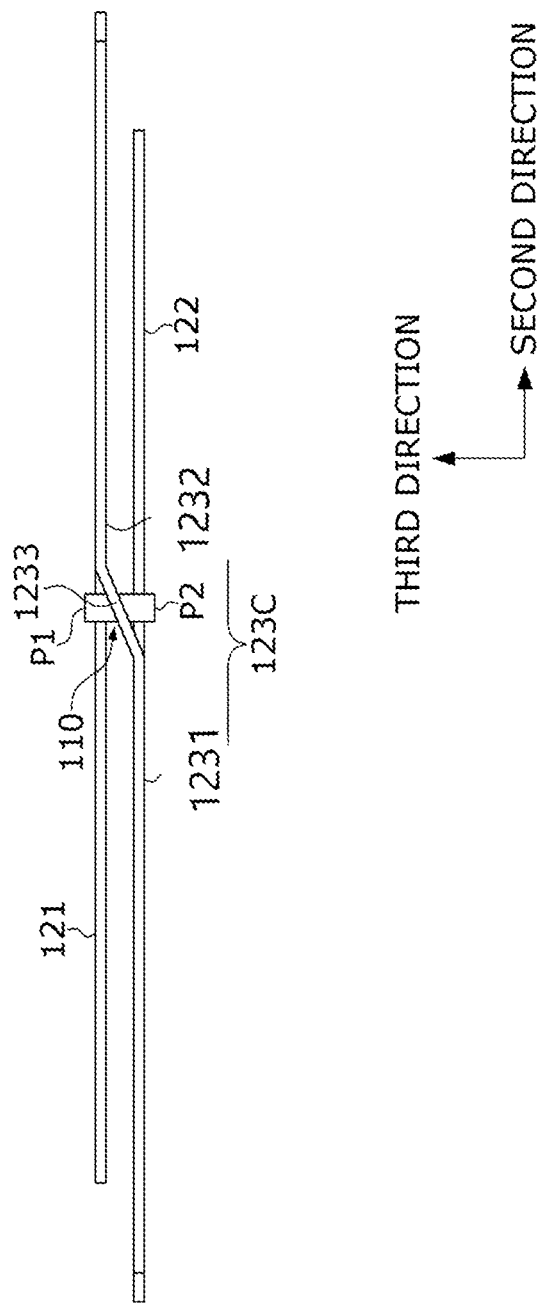

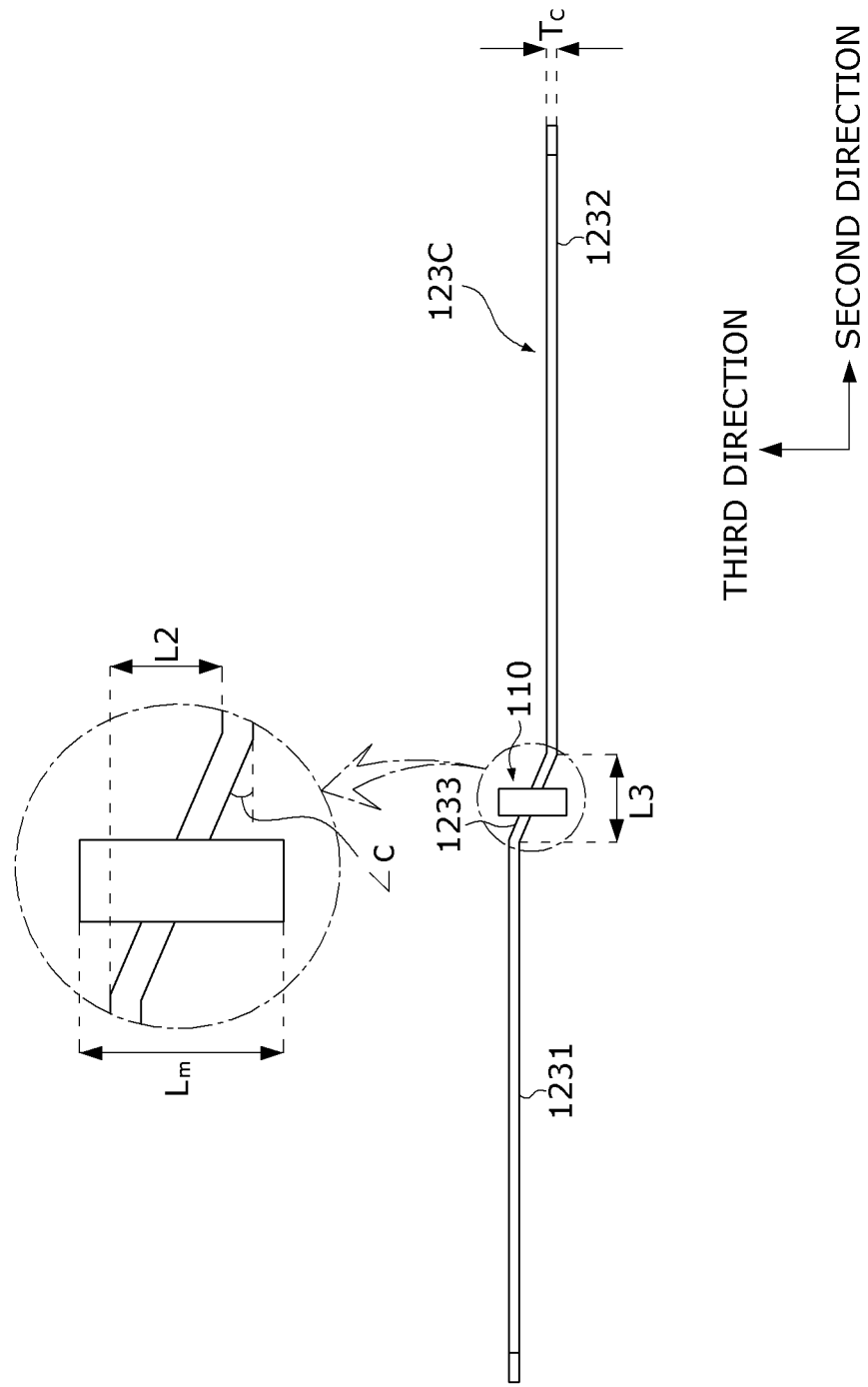
[FIG. 8]

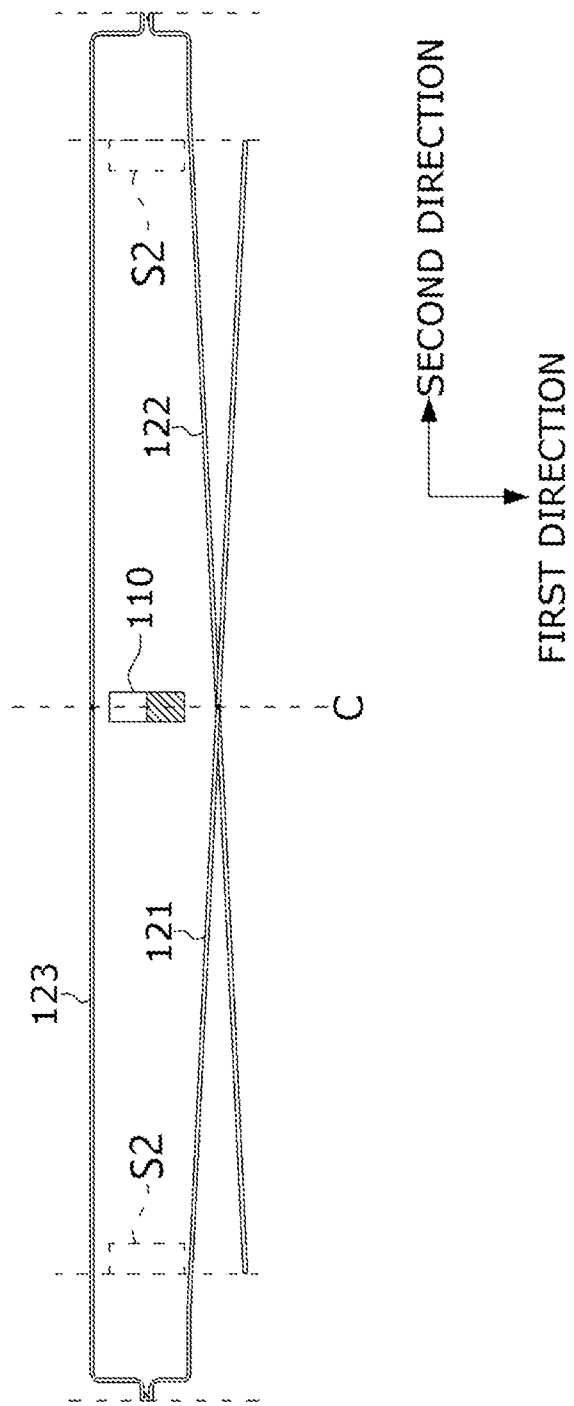
[FIG. 9]

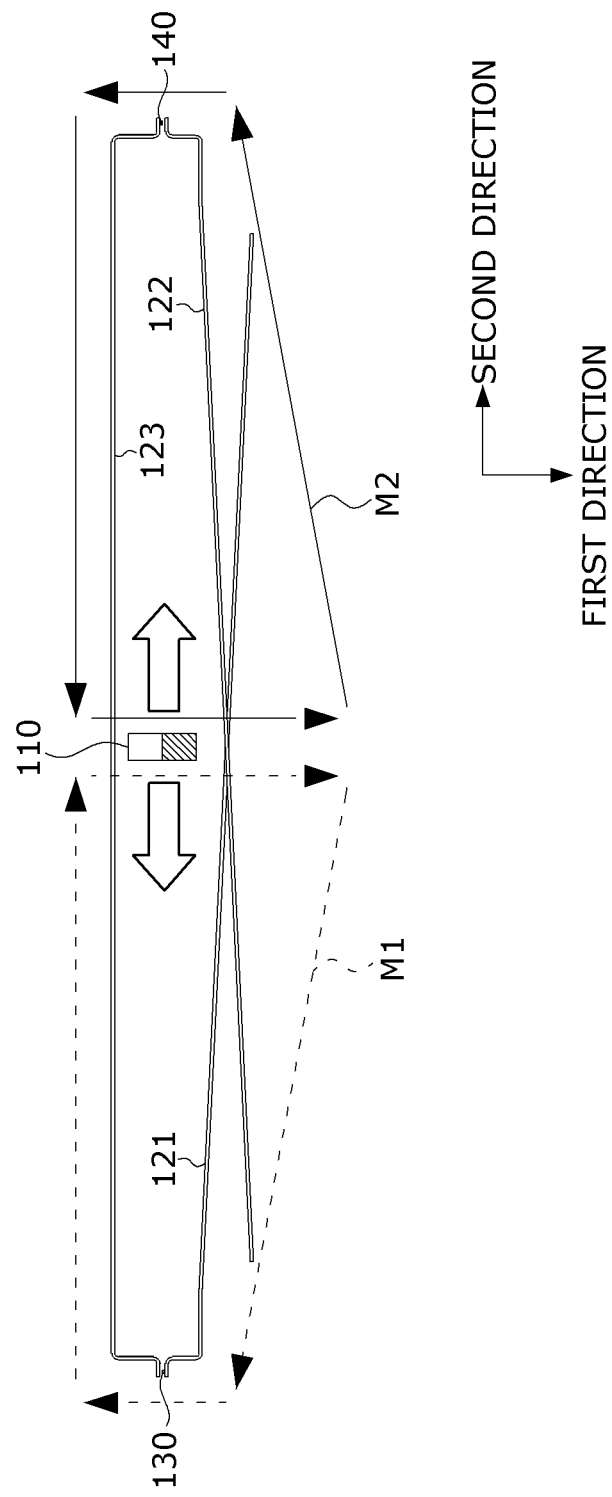

【FIG. 11】
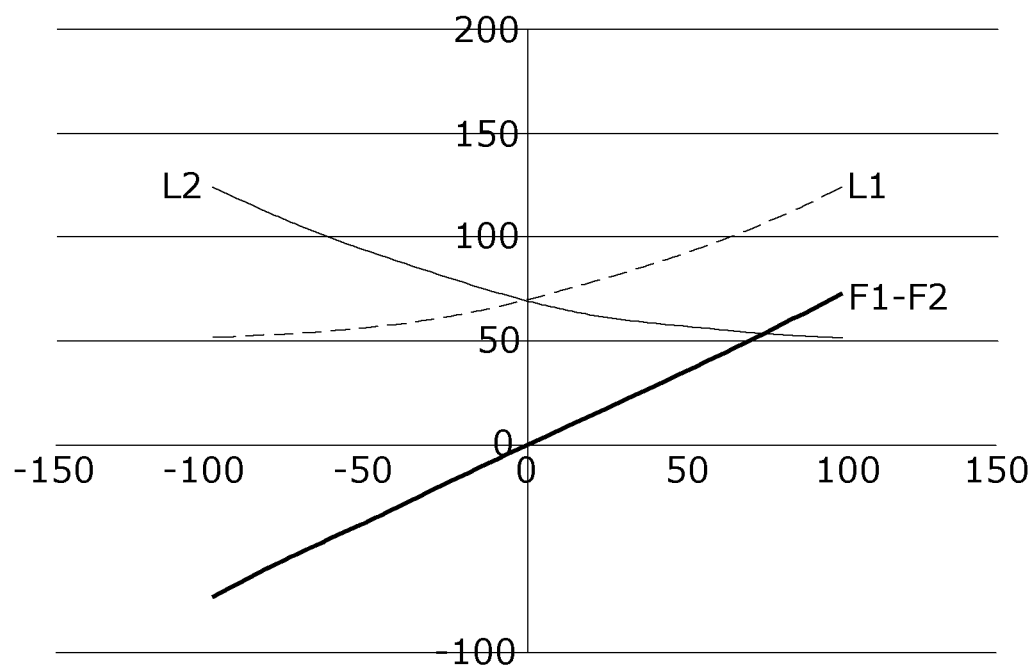

【FIG. 12】
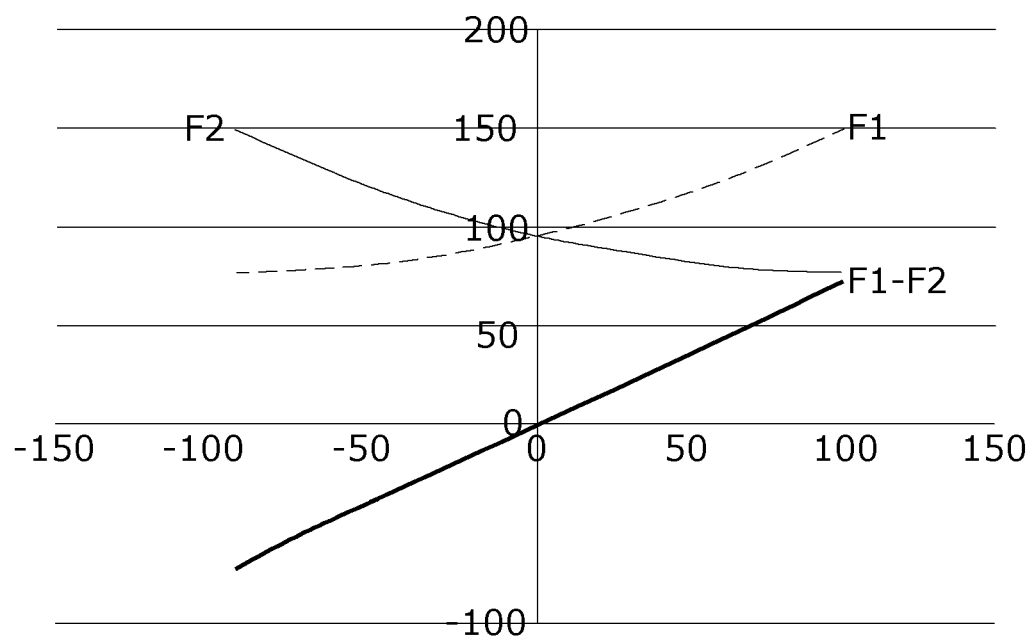

[FIG. 13]
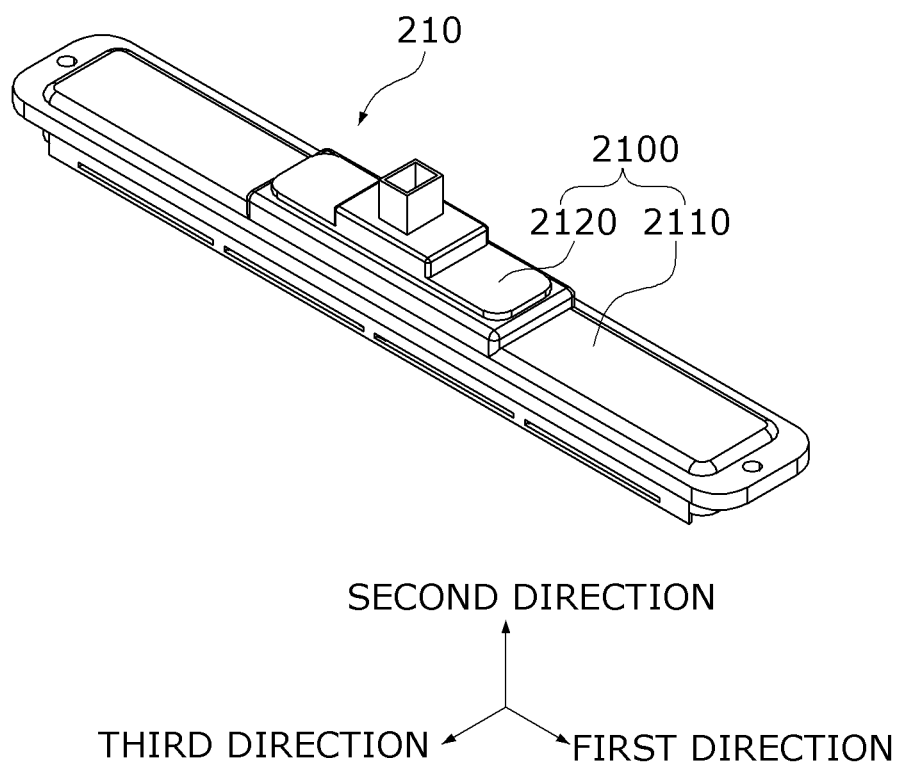
SECOND DIRECTION
THIRD DIRECTION ← → FIRST DIRECTION

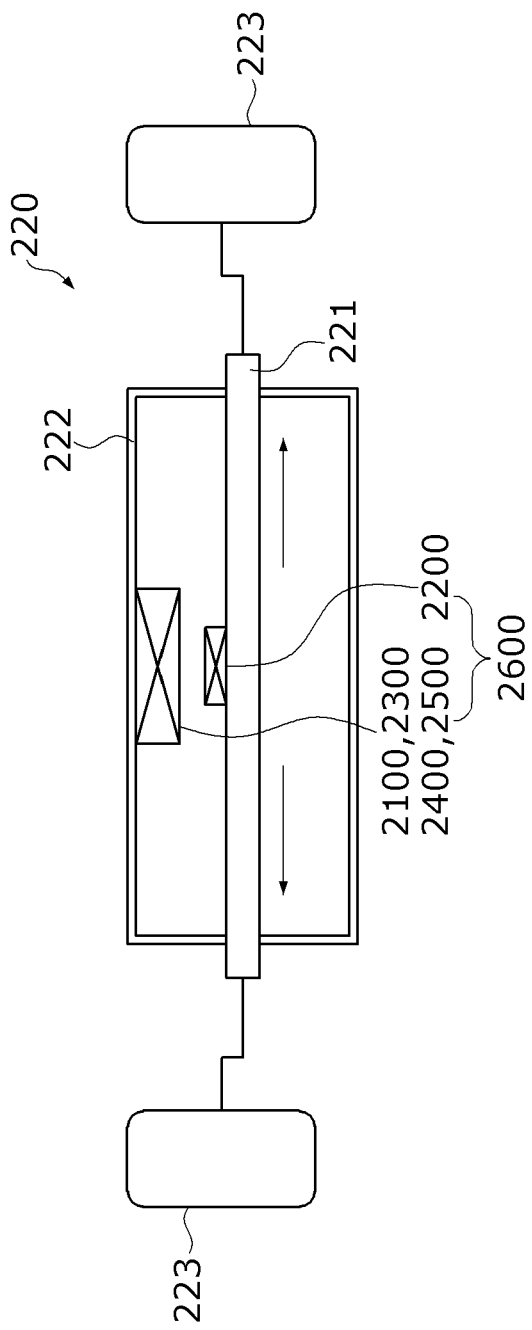
[FIG. 14]

[FIG. 15]
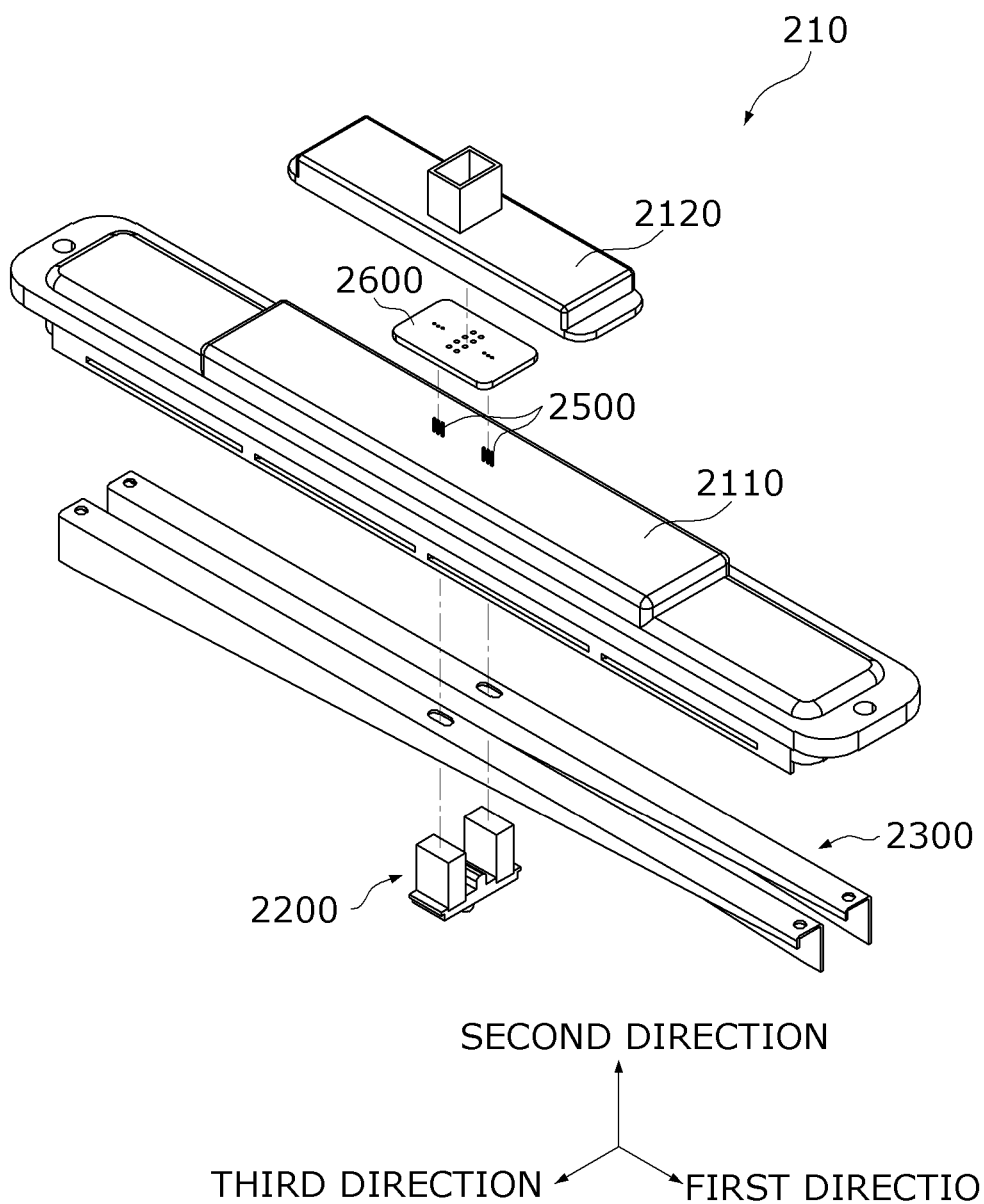
SECOND DIRECTION
THIRD DIRECTION ← → FIRST DIRECTION

[FIG. 16]
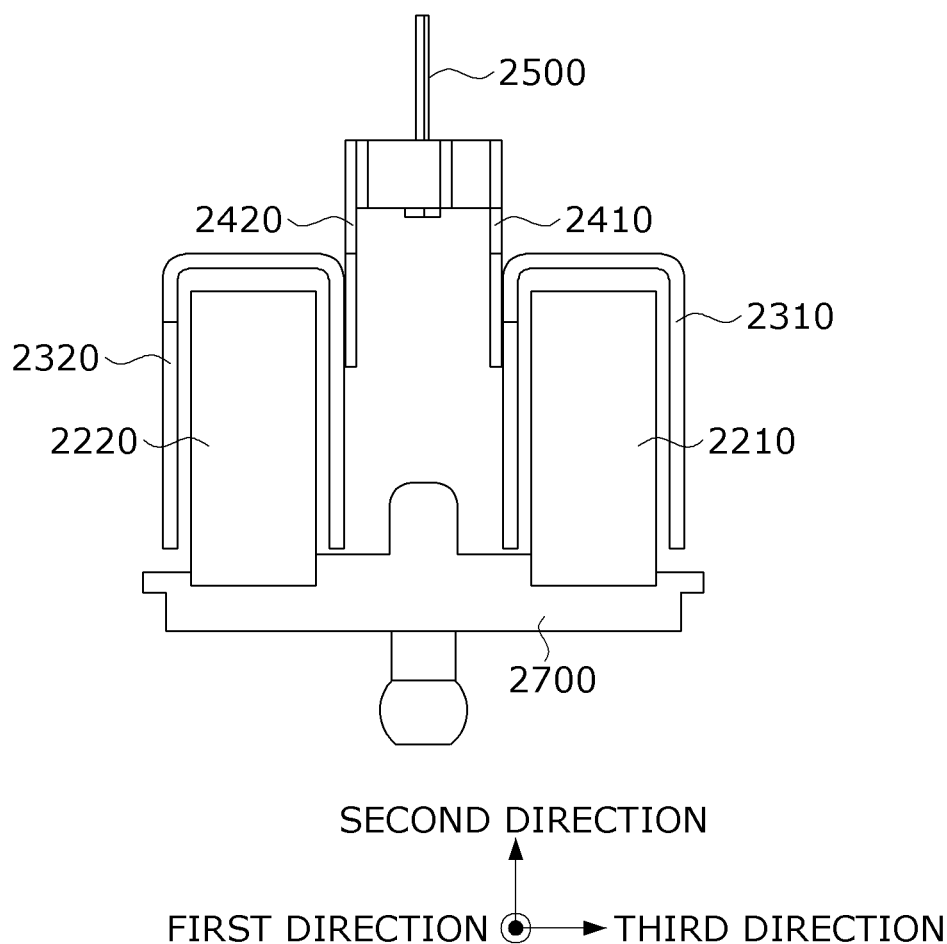
SECOND DIRECTION
FIRST DIRECTION ⊙ → THIRD DIRECTION

[FIG. 17]
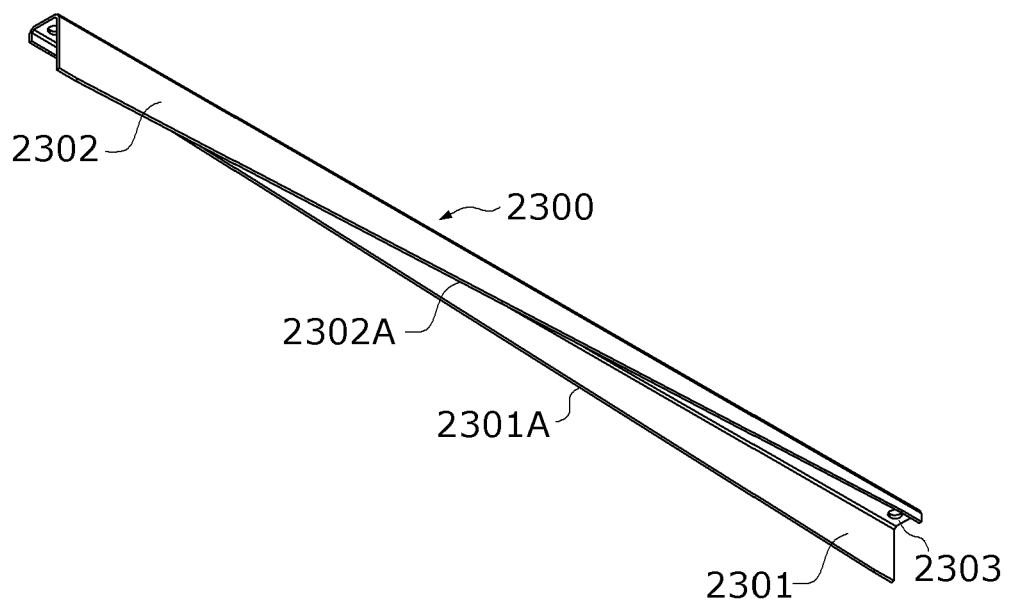

[FIG. 18]
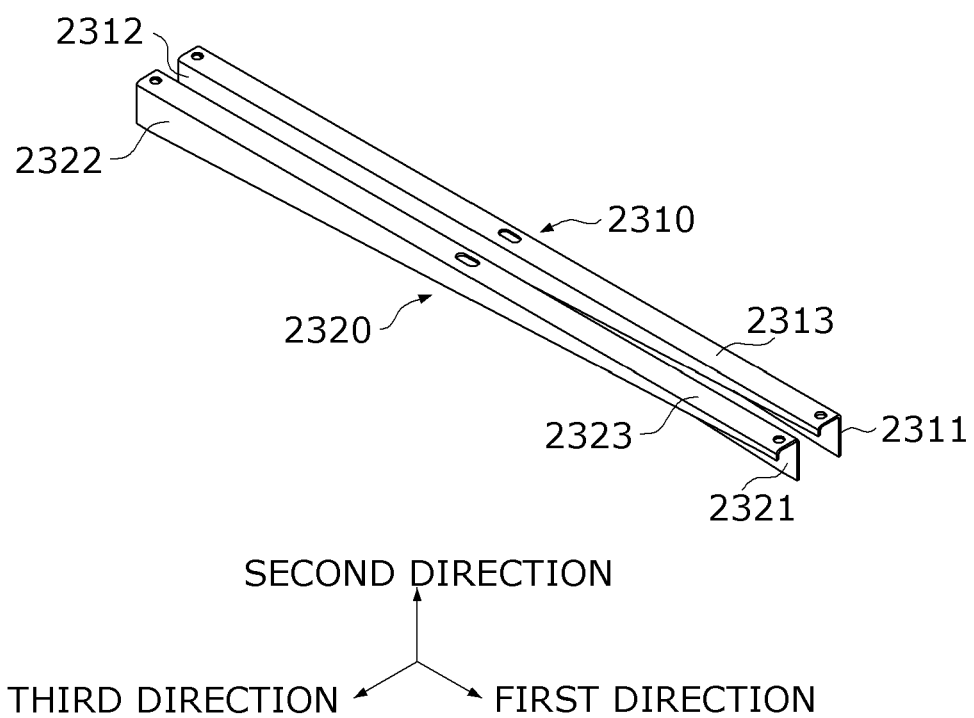

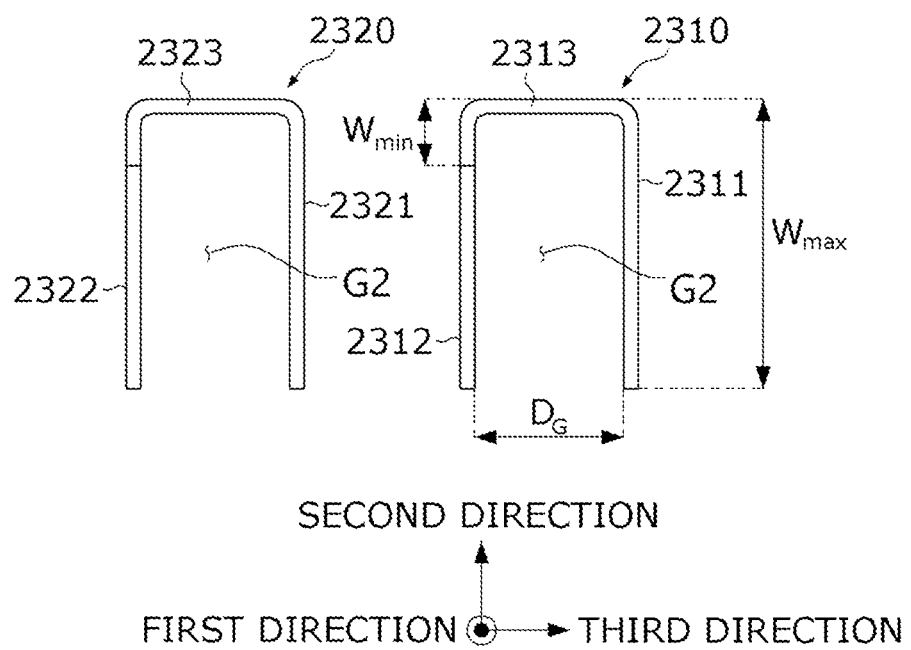
[FIG. 19]

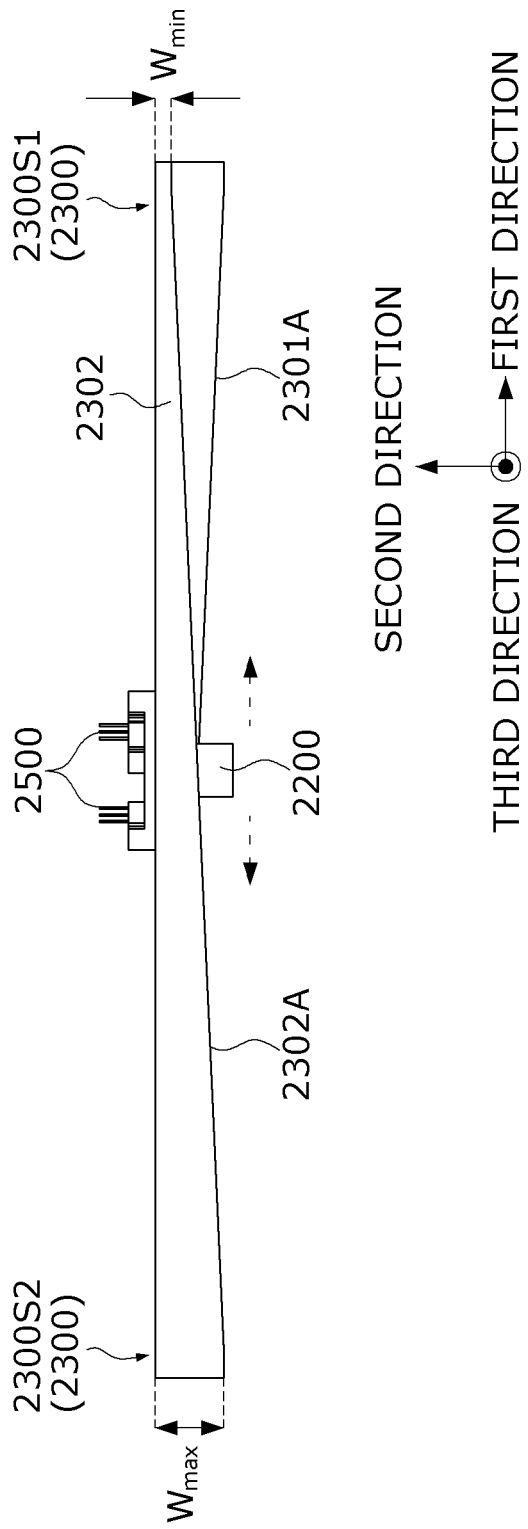
[FIG. 20]

[FIG. 21]
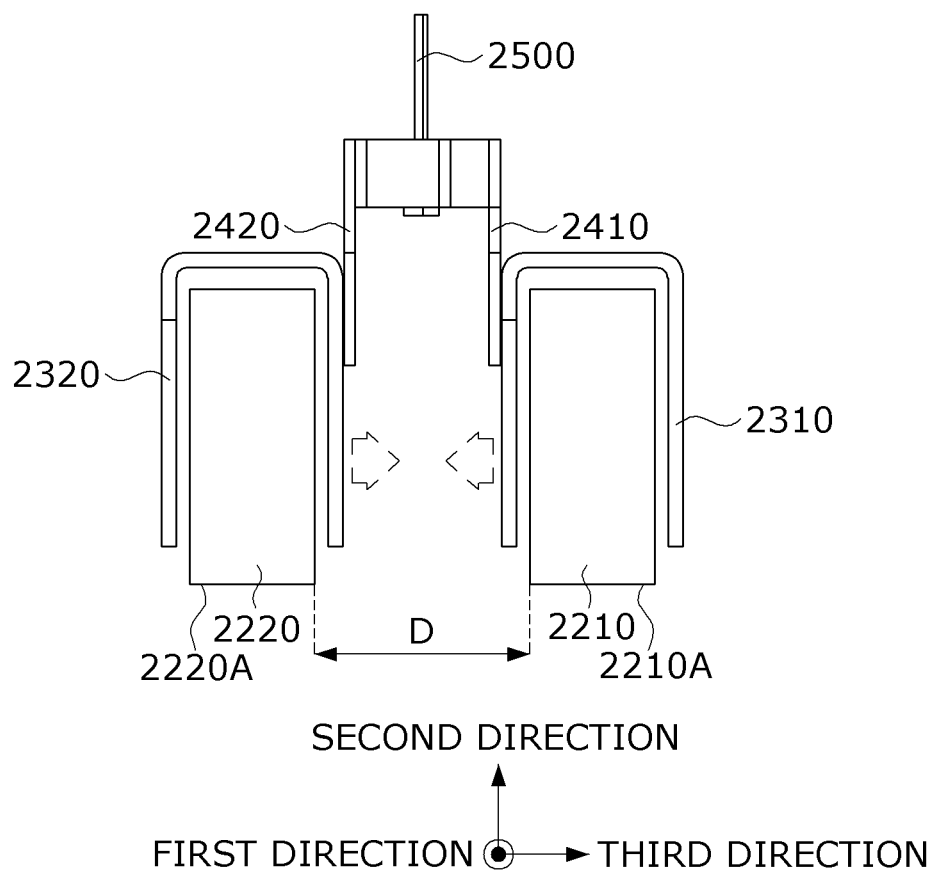

[FIG. 22]
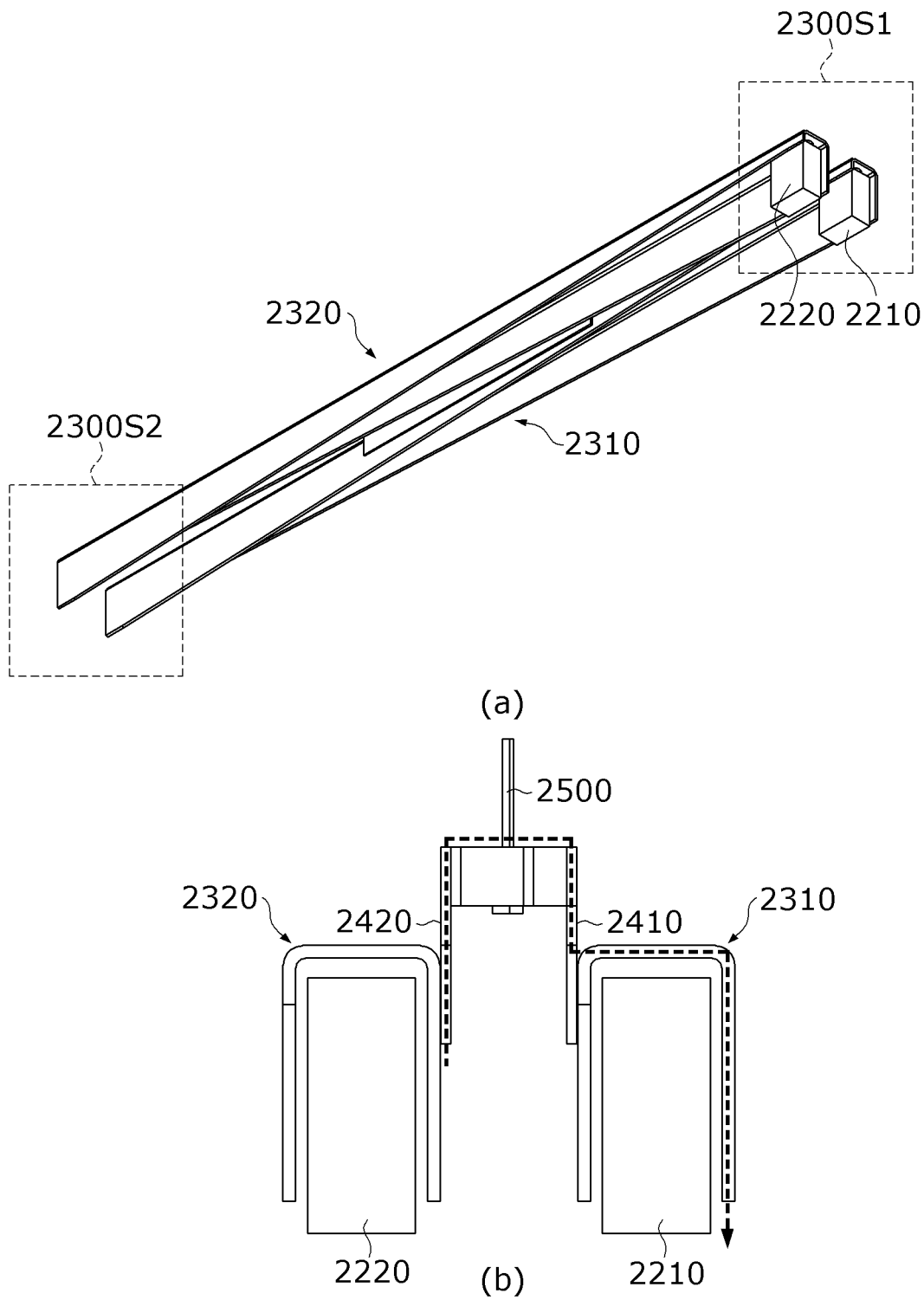

[FIG. 23]
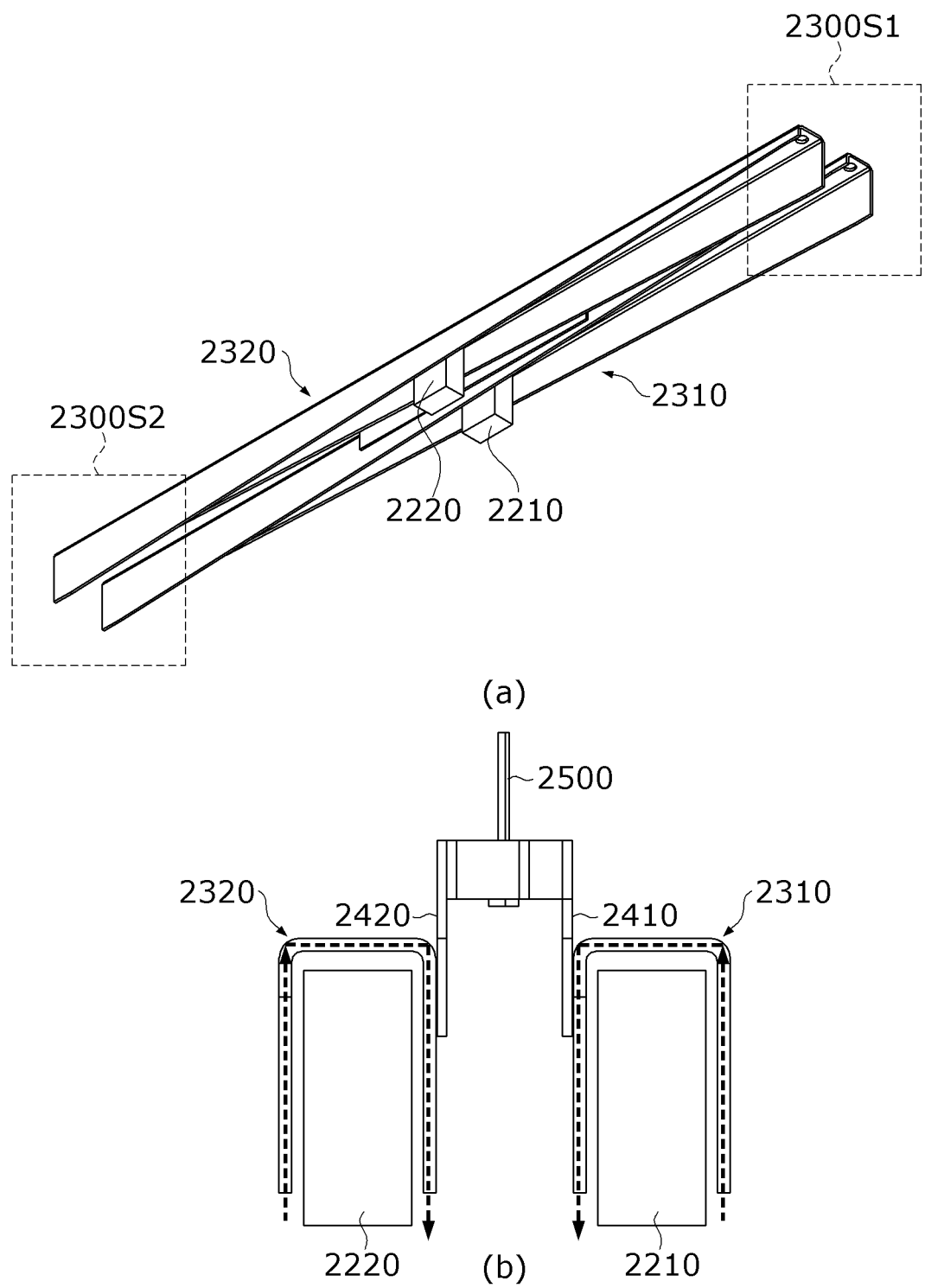

[FIG. 24]
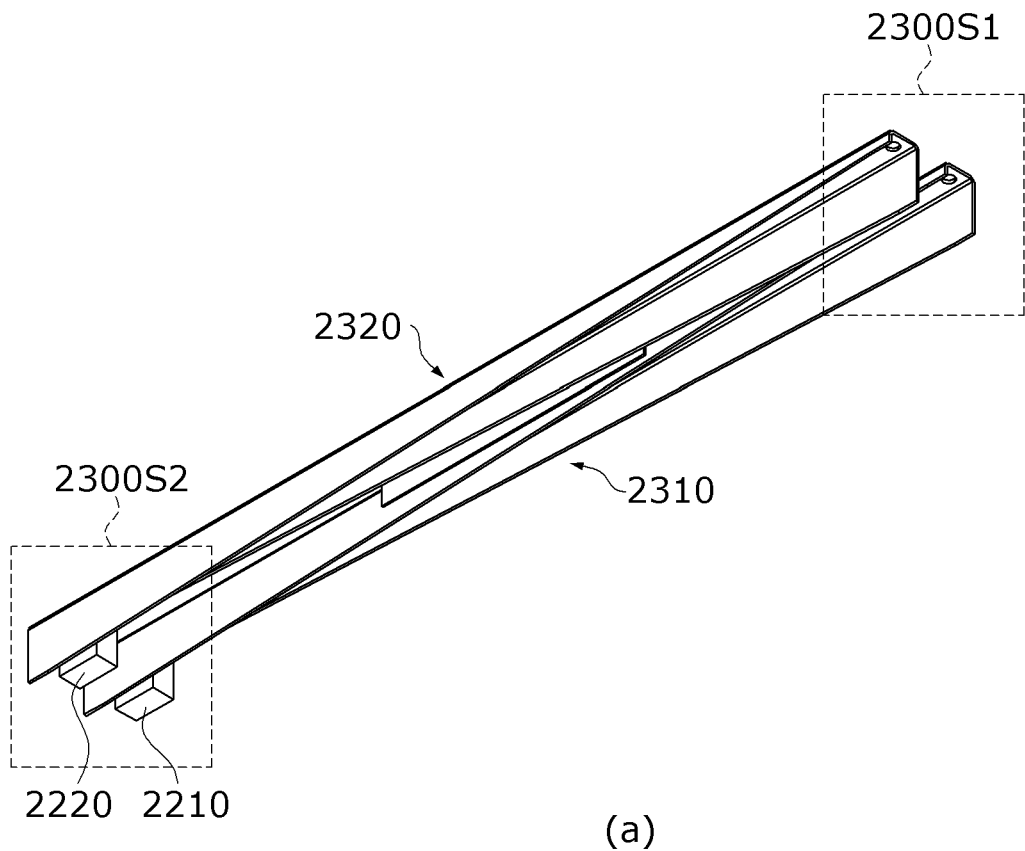
(a)
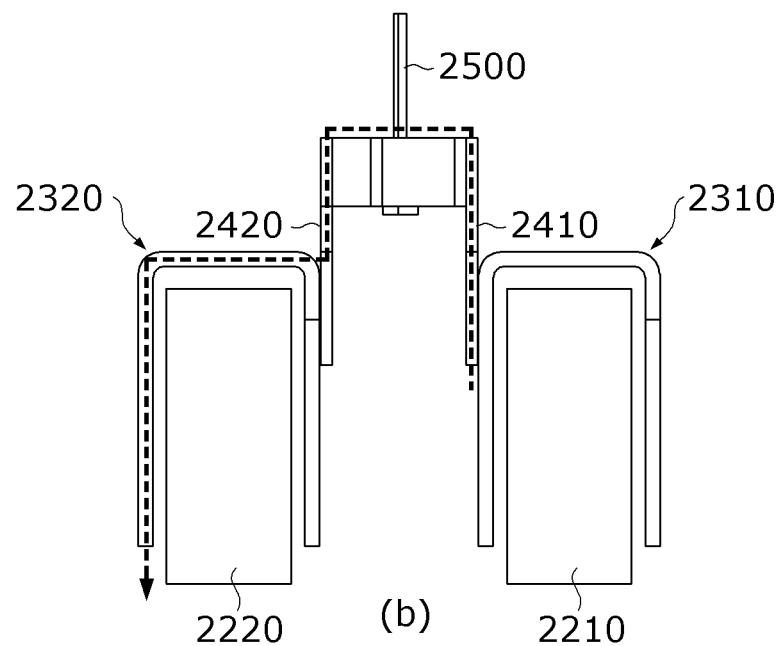
(b)

[FIG. 25]
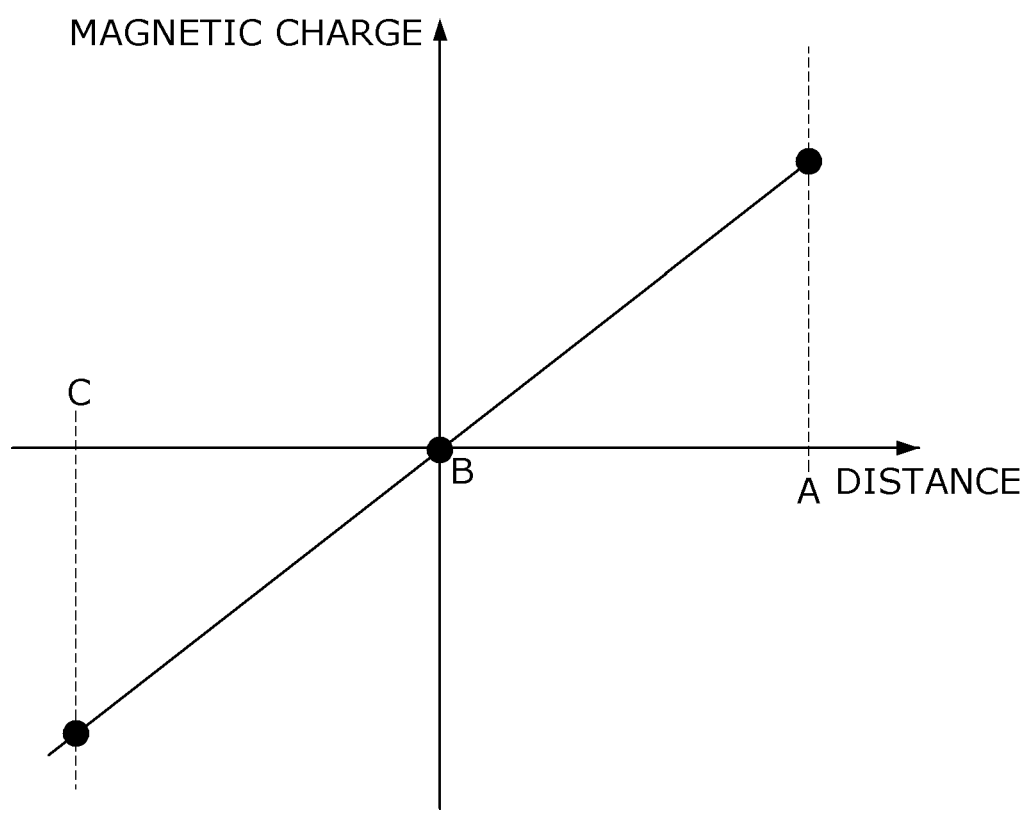

[FIG. 26]
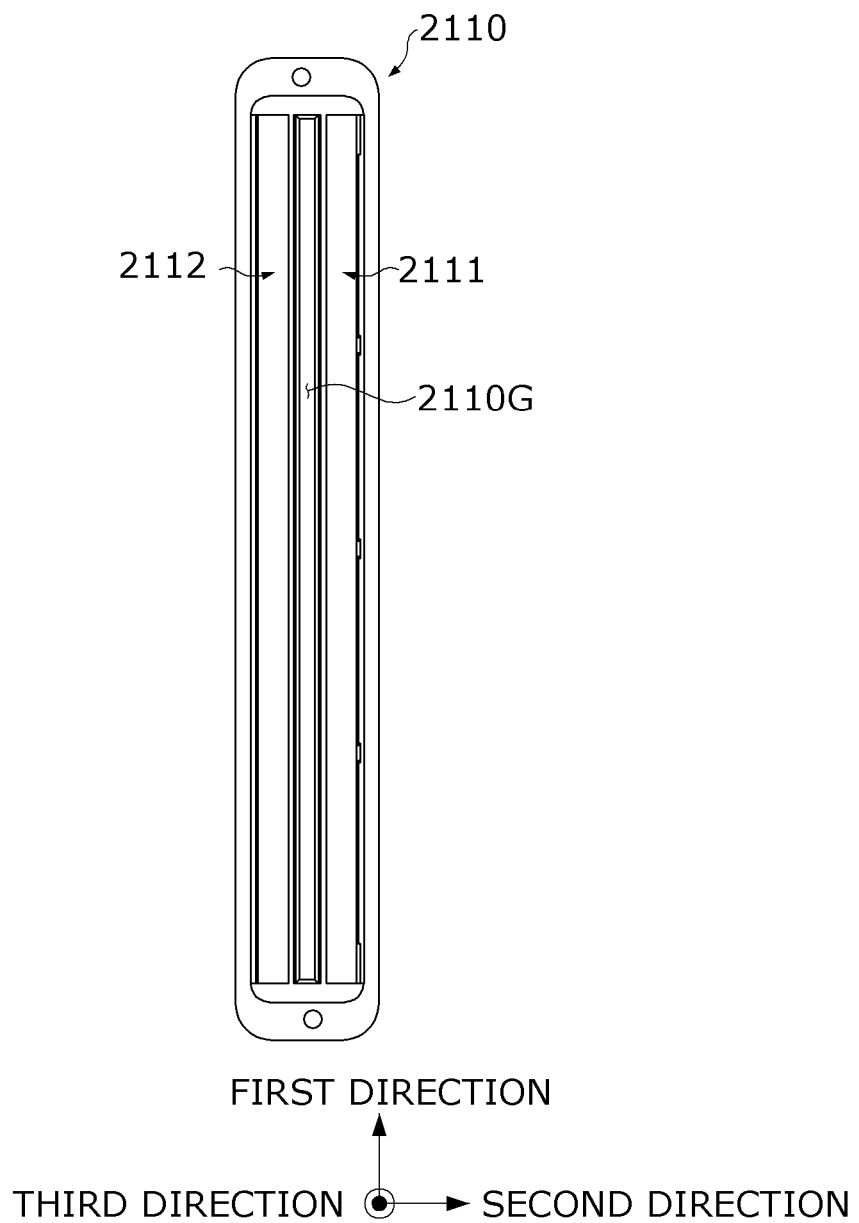
FIRST DIRECTION
THIRD DIRECTION ⊙ → SECOND DIRECTION

[FIG. 27]
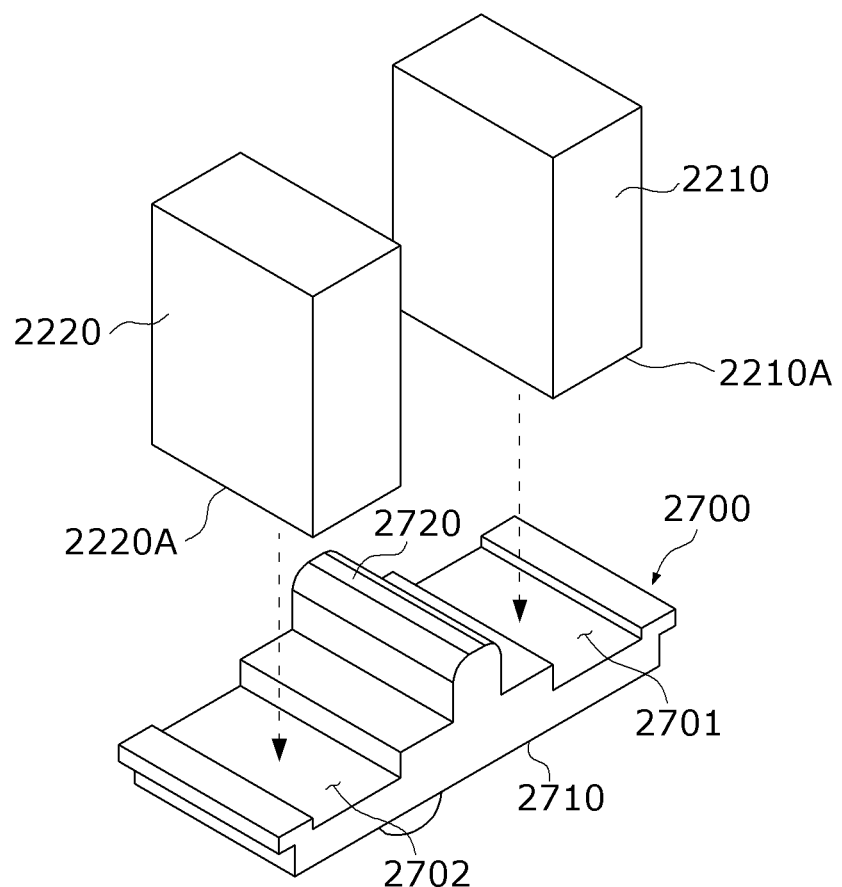

[FIG. 28]
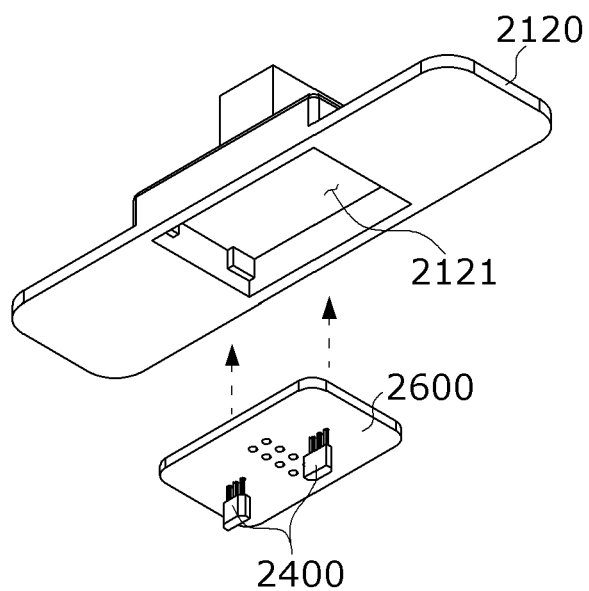

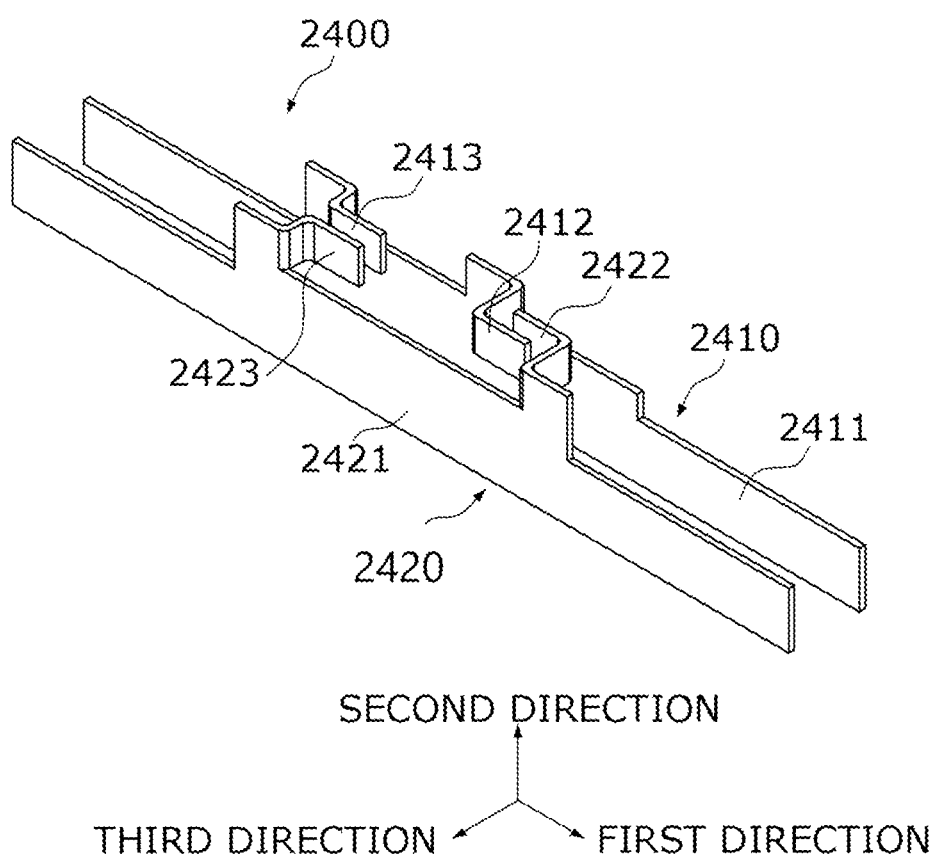
[FIG. 29]

[FIG. 30]
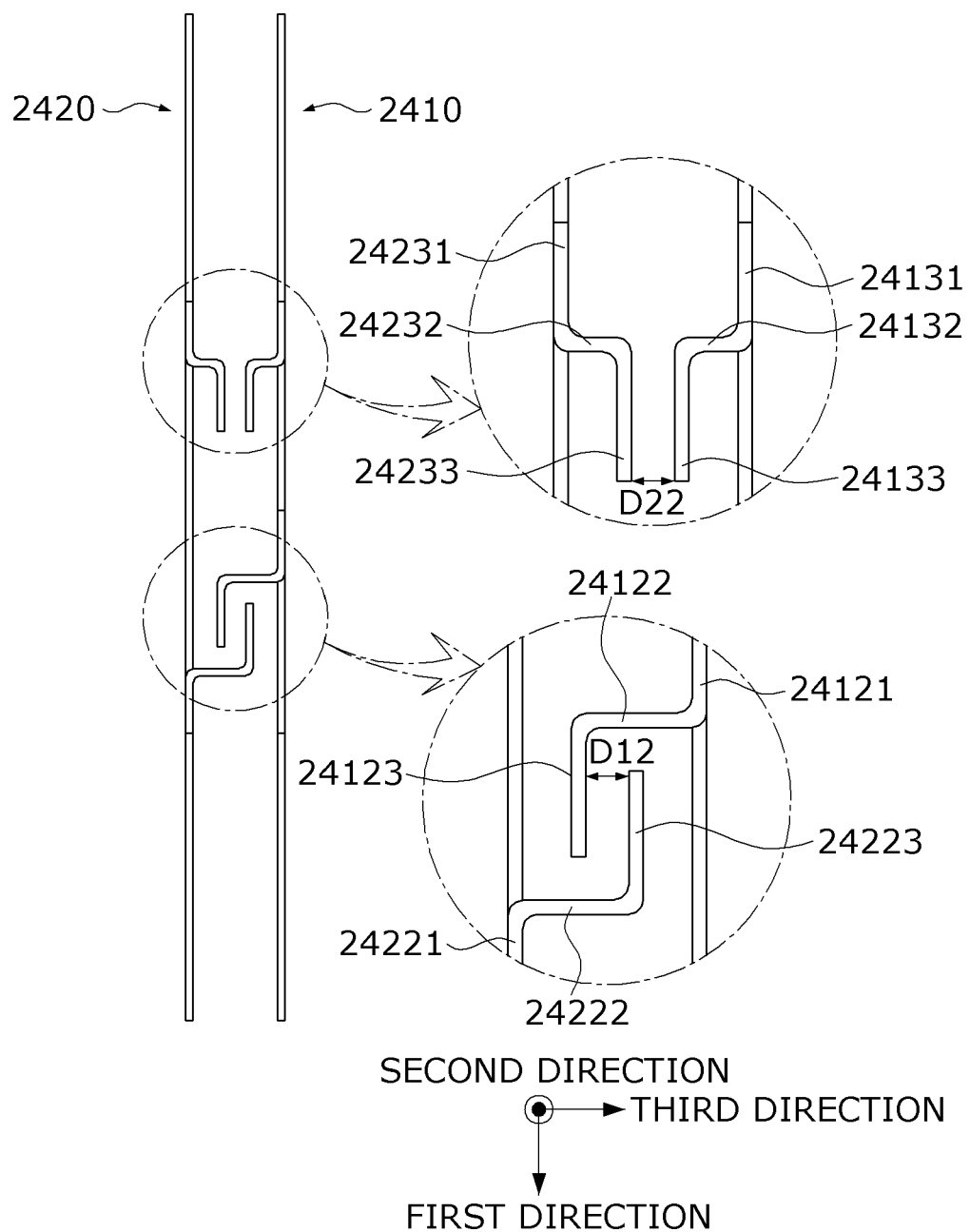

[FIG. 31]
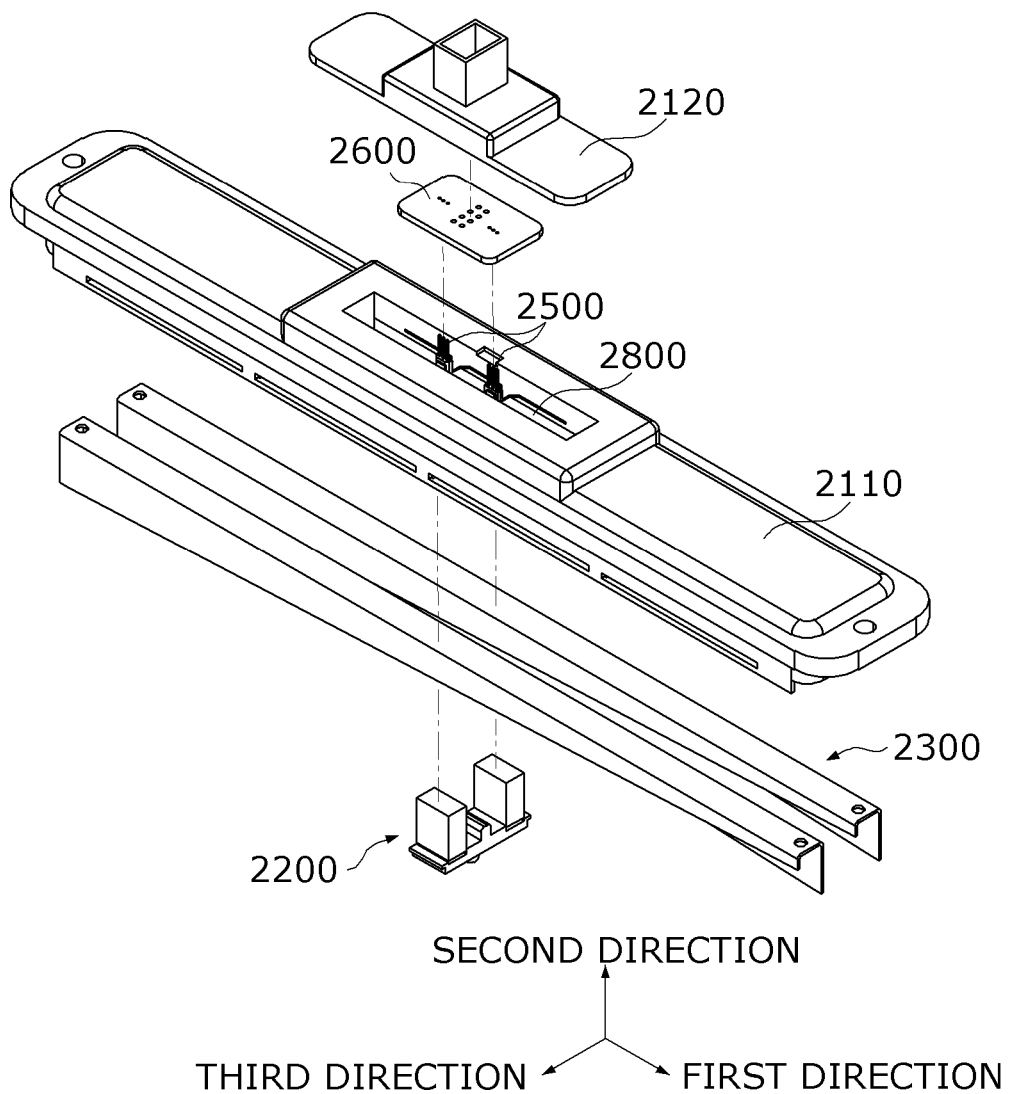

[FIG. 32]
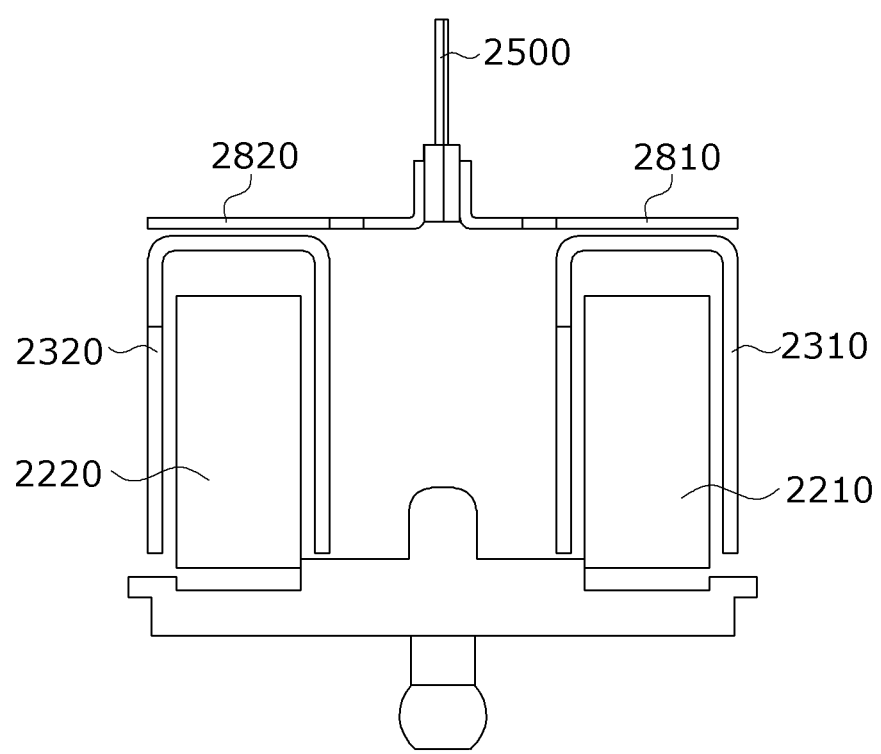

[FIG. 33]
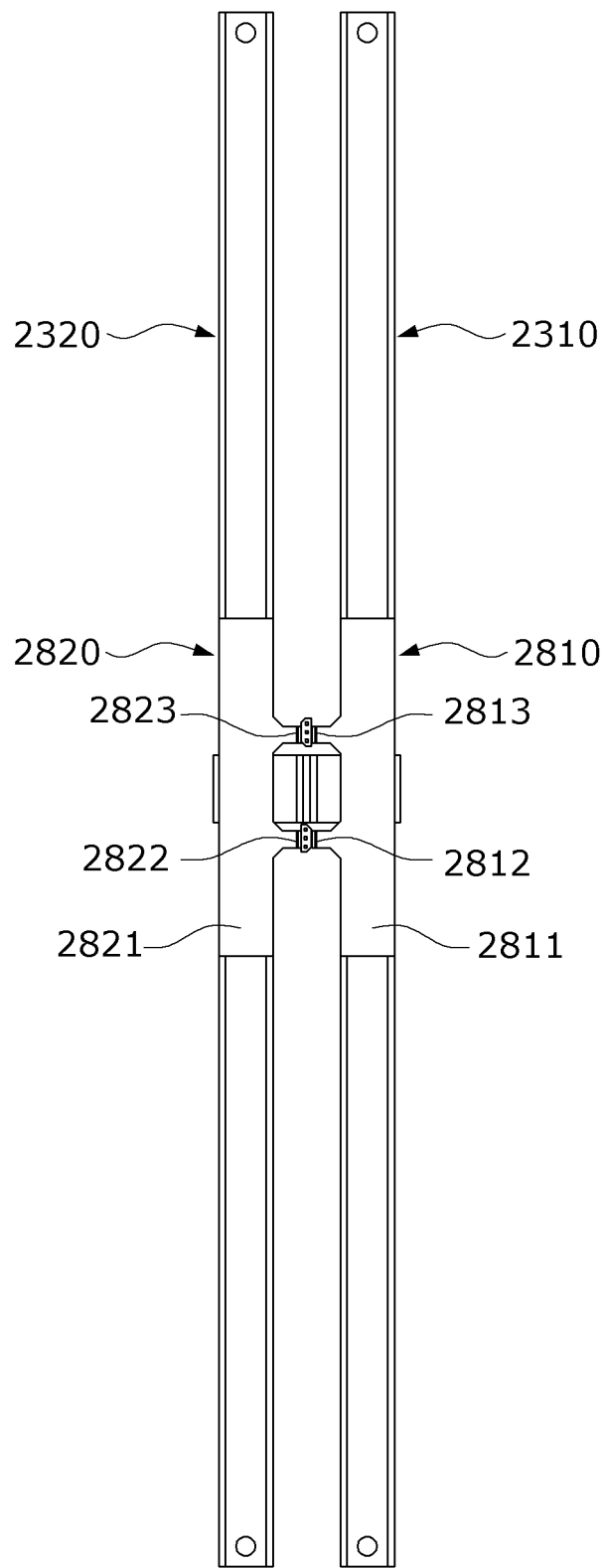

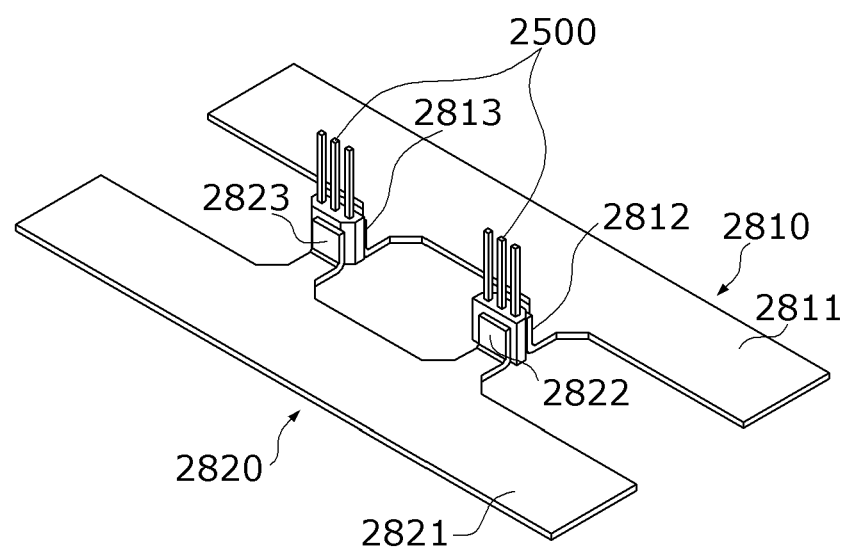
[FIG. 34]

[FIG. 35]
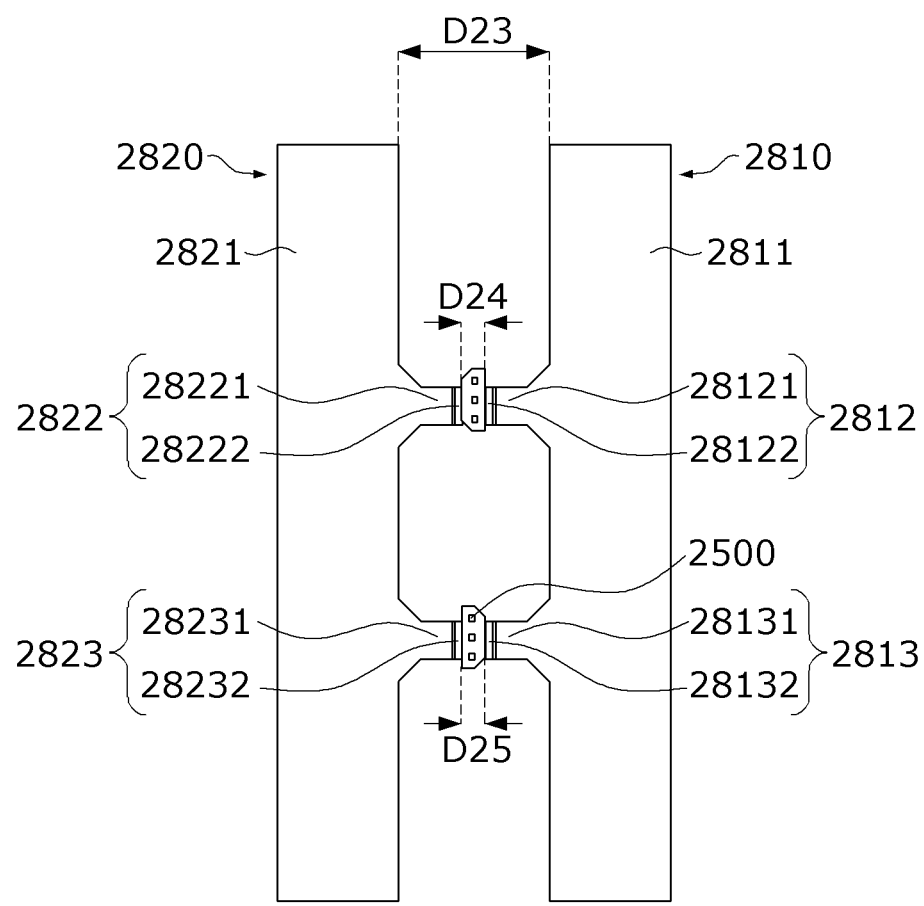

[FIG. 36]
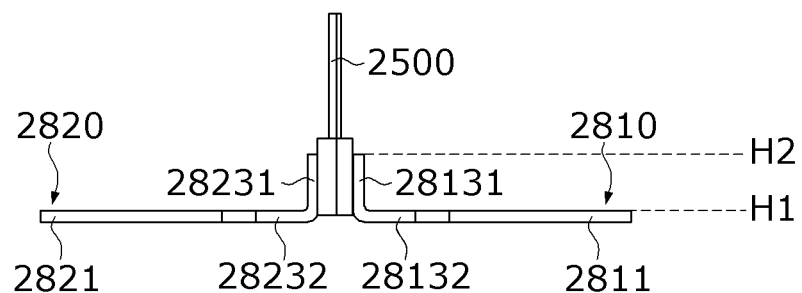

[FIG. 37]
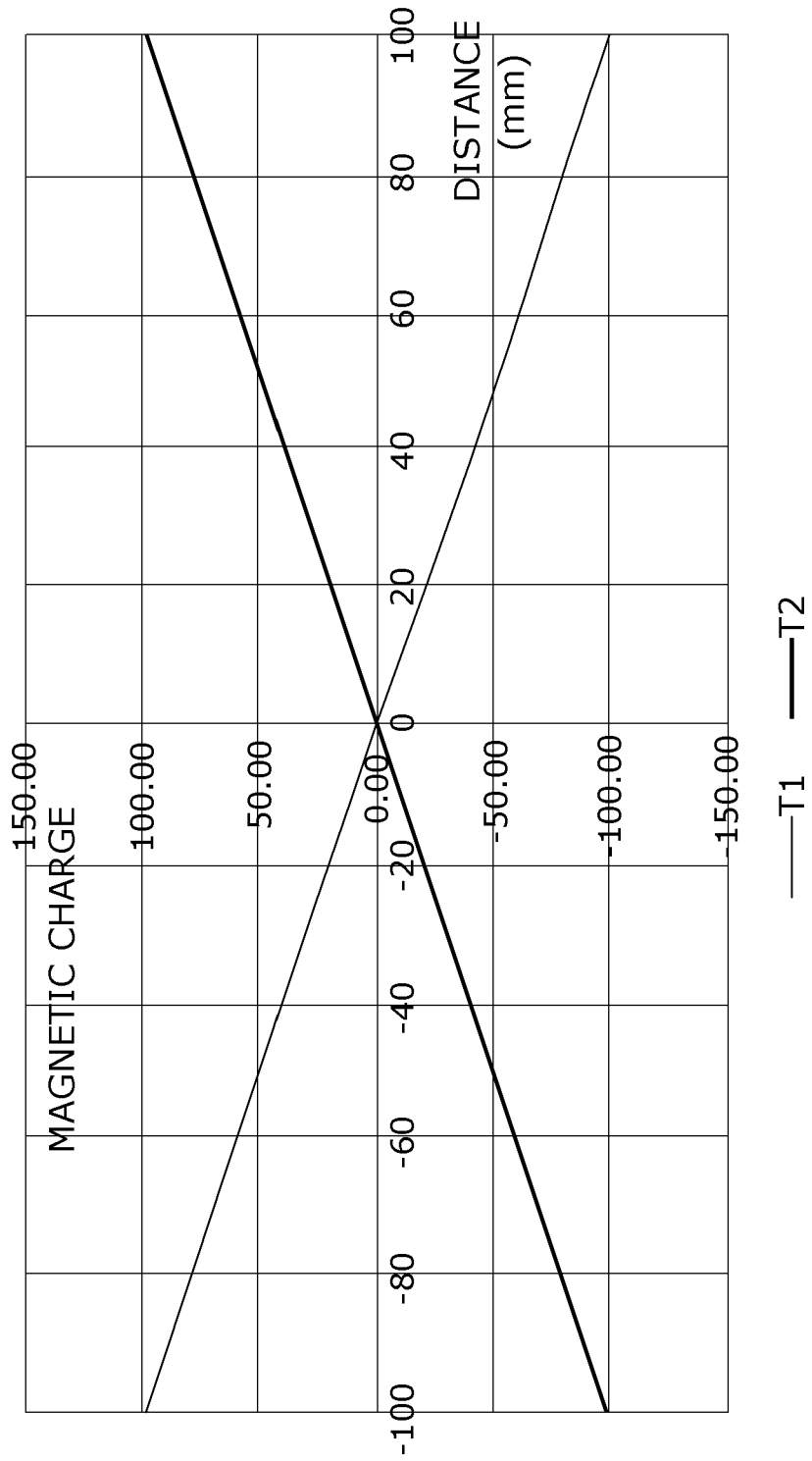

SENSING DEVICE

CROSS-REFERENCE TO RELATED PATENT APPLICATIONS

This application is a U.S. National Stage Application under 35 U.S.C. § 371 of PCT Application No. PCT/KR2021/017977, filed Dec. 1, 2021, which claims priority to Korean Patent Application Nos. 10-2020-0165661, filed Dec. 1, 2020 and 10-2021-0056339, filed Apr. 30, 2021, whose entire disclosures are hereby incorporated by reference.

TECHNICAL FIELD

Embodiments relate to a sensing device.

BACKGROUND ART

An electric steering structure includes a rack bar that converts a rotational movement of an input shaft into a linear movement and transmits the linear movement to wheels of a vehicle. In addition, the electric steering structure includes a sensing device that measures a steering angle by detecting a position of the rack bar.

The sensing device includes a magnet mounted on the rack bar, a tube through which the magnet passes, and a plurality of coils wound around the tube. In addition, the sensing device may detect the position of the rack bar through an induced magnetic field between the coils and the magnet. However, there is a problem in that manufacturing costs are increased due to the large number of components.

In addition, the sensing device detects a position of the magnet on the basis of a change in magnetic flux density of the magnet. However, a conventional sensing device has a problem in that a Gauss value of the magnet is non-linearly measured. Accordingly, an error in detection occurs, and thus, the measurement accuracy of the sensing device is reduced.

DISCLOSURE

Technical Problem

The present invention is directed to providing a sensing device allowing manufacturing costs to be reduced by simplifying components and the measurement accuracy to be improved by securing linearity of a Gauss value of a magnet.

Technical Solution

An embodiment may provide a sensing device including a magnet, a collector disposed to correspond to a path along which the magnet moves, and a first sensor disposed in the collector, wherein the collector includes a first leg part, a second leg part, and a third leg part, the magnet includes a first pole and a second pole, the first leg part and the second leg part are disposed to face the first pole, and the third leg part is disposed to face the second pole.

An embodiment may provide a sensing device including a magnet, a collector disposed to correspond to a path along which the magnet moves, a first sensor disposed in the collector, and a second sensor disposed on an opposite side of the first sensor with respect to the magnet, wherein the collector includes a first leg part, a second leg part, and a third leg part, the first sensor is disposed between the first leg part and the third leg part, and the second sensor is disposed between the second leg part and the third leg part.

An embodiment may provide a sensing device including a magnet, and a collector disposed to correspond to a path along which the magnet moves, wherein the collector includes a first leg part, a second leg part, and a third leg part, the first leg part is disposed on a periphery of an upper end portion of the magnet, the second leg part is disposed on a periphery of a lower end portion of the magnet, and the third leg part has one side facing the first leg part and the other side facing the second leg part, and a position of the magnet is determined from a difference between a position of the magnet detected by using the first leg part and the third leg part and a position of the magnet detected by using the second leg part and the third leg part.

The first leg part and the second leg part may be twisted in position.

A spacing between the first leg part and the third leg part may include a region that increases from one side to the other side, and a spacing between the second leg part and the third leg part includes a region that increases from the other side to one side.

The third leg part may include a third inclined region inclined with respect to a moving direction of the magnet.

A thickness of the third leg part may be greater than a thickness of each of the first leg part and the second leg part.

A distance between the first leg part and the magnet may increase as the first leg part moves from an initial position, and a distance between the second leg part and the magnet may decrease as the second leg part moves from an initial position.

The third leg part and the magnet may be spaced apart by a first distance at a first position, the third leg part and the magnet may be spaced apart by a second distance at a second position, which is spaced apart from the first position, and the first distance and the second distance may be the same.

The third leg part may include a first part facing the first leg part, a second part facing the second leg part, and a third part connecting the first part and the second part.

An embodiment may provide a sensing device including a magnet, a stator disposed on a path along which the magnet moves, and a Hall sensor disposed to face the magnet, wherein the magnet moves in a first direction, the stator includes a first part and a second part facing the magnet, a width of the first part decreases in the first direction, and a width of the second part increases in the first direction.

A ratio at which the width of the first part decreases in the first direction may be equal to a ratio at which the width of the second part increases in the first direction.

The magnet may move relative to the stator in the first direction.

The magnet may be disposed between the first part and the second part.

A width of one end portion of the first part may be equal to a width of the other end portion of the second part.

The stator may include a third part connecting the first part and the second part, and the third part may have a third width, which is a width in a third direction, greater than a width of the magnet in the third direction.

An embodiment may provide a sensing device including a first magnet, a second magnet spaced apart from the first magnet, a first stator disposed on a path along which the first magnet moves, a second stator disposed on a path along which the second magnet moves, and a Hall sensor disposed to face the first magnet and the second magnet, wherein the first magnet and the second magnet move in a first direction, the first stator includes a 1Ath part and a 2Ath part facing the first magnet, the second stator includes a 1Bth part and a 2Bth part facing the second magnet, the 1Ath part and the 1Bth part decrease in width in the first direction, and the 2Ath part and the 2Bth part increase in width in the first direction.

A ratio at which the widths of the 1Ath part and the 1Bth part decrease in the first direction may be equal to a ratio at which the widths of the 2Ath part and the 2Bth part increase in the first direction.

The first magnet and the second magnet may move relative to the first stator and the second stator, respectively, in the first direction.

The first magnet may be disposed between the 1Ath part and the 2Ath part, and the second magnet may be disposed between the 1Bth part and the 2Bth part.

The sensing device may include a first housing in which the first stator and the second stator are disposed, and a magnet holder on which the first magnet and the second magnet are disposed, wherein the first housing and the magnet holder may be connected to be slidably movable in the first direction.

The first housing may include a first groove extending in the first direction, and the magnet holder may include a first protrusion disposed in the first groove to be slidably movable in the first direction.

The sensing device may include a printed circuit board (PCB) connected to the Hall sensor.

The sensing device may include a second housing coupled to the first housing, and the PCB may be disposed in the second housing.

The sensing device may include a first collector and a second collector disposed with the Hall sensor interposed therebetween, wherein the first collector and the second collector may be disposed between the first stator and the second stator.

The first collector may include a first body and a first leg extending from the first body, the second collector may include a second body and a second leg extending from the second body, and the Hall sensor may be disposed between the first leg and the second leg.

The first leg may be disposed closer to the second body than the first body, and the second leg may be disposed closer to the first body than the second body.

The first leg may include a first extension part connected to the first body and a first bent part bent from the first extension part, the second leg may include a second extension part connected to the second body and a second bent part extending from the second extension part, the first extension part and the second extension part may not overlap in the third direction, and the first bent part and the second bent part may overlap in the third direction.

The first leg may be disposed closer to the first body than the second body, and the second leg may be disposed closer to the second body than the first body.

The first leg may include a first extension part connected to the first body and a first bent part bent from the first extension part, the second leg may include a second extension part connected to the second body and a second bent part extending from the second extension part, the first extension part and the second extension part may overlap in the third direction, and the first bent part and the second bent part may overlap in the third direction.

Advantageous Effects

According to an embodiment, the number of components of a sensing device can be reduced by sharing a collector for collecting magnetic fields of a plurality of sensors, thereby reducing manufacturing costs.

According to an embodiment, a sensing device with improved measurement accuracy can be provided by securing linearity of a Gauss value of a magnet.

According to an embodiment, a sensing device that is advantageous in compensating for external resistance can be provided by improving a shape of a collector.

DESCRIPTION OF DRAWINGS

FIG. 1 is a perspective view illustrating a sensing device according to one embodiment.

FIG. 2 is a view schematically illustrating a state in which the sensing device according to one embodiment is installed in a vehicle steering structure.

FIG. 3 is a side view illustrating the sensing device according to one embodiment.

FIG. 4 is a plan view illustrating the sensing device according to one embodiment.

FIG. 5 is a side view illustrating a sensing device according to another embodiment.

FIG. 6 is an enlarged view of region A of FIG. 5.

FIG. 7 is a side view illustrating a sensing device according to still another embodiment.

FIG. 8 is a side view illustrating a third leg part and a magnet shown in FIG. 7.

FIG. 9 is a plan view illustrating a path along which a magnet moves in the sensing device according to one embodiment.

FIG. 10 is a plan view illustrating the flow of a magnetic field generated by the magnet in the sensing device according to one embodiment.

FIG. 11 is a graph illustrating a result of measuring a magnetic flux density using the sensing device according to one embodiment in a state in which an external magnetic field is not introduced.

FIG. 12 is a graph illustrating a result of measuring a magnetic flux density using the sensing device according to one embodiment in a state in which an external magnetic field is introduced.

FIG. 13 is a perspective view illustrating the sensing device according to one embodiment.

FIG. 14 is a view schematically illustrating a state in which the sensing device according to one embodiment is installed in a vehicle steering structure.

FIG. 15 is an exploded perspective view illustrating the sensing device according to one embodiment.

FIG. 16 is a front view illustrating a state in which a housing is removed from the sensing device according to one embodiment.

FIG. 17 is a perspective view illustrating a stator of the sensing device according to one embodiment.

FIG. 18 is a perspective view illustrating a first stator and a second stator of the sensing device according to one embodiment.

FIG. 19 is a front view illustrating the first stator and the second stator of the sensing device according to one embodiment.

FIG. 20 is a side view illustrating a magnet, a stator, and a Hall sensor of the sensing device according to one embodiment.

FIG. 21 is a front view illustrating the magnet, the stator, and the Hall sensor of the sensing device according to one embodiment.

FIG. 22 (a) and (b) are views illustrating the flow of fluxes induced by a first magnet and a second magnet disposed at a first position in the sensing device according to one embodiment.

FIG. 23 (a) and (b) are views illustrating the flow of fluxes induced by the first magnet and the second magnet disposed at a second position in the sensing device according to one embodiment.

FIG. 24 (a) and (b) are views illustrating the flow of fluxes induced by the first magnet and the second magnet disposed at a third position in the sensing device according to one embodiment.

FIG. 25 is a graph illustrating a change amount in Gauss for each position of the magnet of the sensing device according to one embodiment.

FIG. 26 is a bottom view illustrating a first housing of the sensing device according to one embodiment.

FIG. 27 is a perspective view illustrating a state in which the first magnet, the second magnet, and a magnet holder of the sensing device according to one embodiment are coupled.

FIG. 28 is a perspective view illustrating a state in which a second housing of the sensing device according to one embodiment is coupled to a printed circuit board and the Hall sensor of the sensing device.

FIG. 29 is a perspective view illustrating a collector of the sensing device according to one embodiment.

FIG. 30 is a plan view illustrating the collector of the sensing device according to one embodiment.

FIG. 31 is an exploded perspective view illustrating a sensing device according to another embodiment.

FIG. 32 is a front view illustrating a state in which a housing is removed from the sensing device according to another embodiment.

FIG. 33 is a plan view illustrating the state in which the housing is removed from the sensing device according to another embodiment.

FIG. 34 is a perspective view illustrating a collector and a Hall sensor of the sensing device according to another embodiment.

FIG. 35 is a plan view illustrating the collector and the Hall sensor of the sensing device according to another embodiment.

FIG. 36 is a front view illustrating the collector and the Hall sensor of the sensing device according to another embodiment.

FIG. 37 is a graph illustrating a change amount in Gauss measured by the first stator and the second stator of the sensing device according to one embodiment.

MODES OF THE INVENTION

Hereinafter, exemplary embodiments of the present invention will be described in detail with reference to the accompanying drawings.

FIG. 1 is a perspective view illustrating a sensing device according to an embodiment, and FIG. 2 is a view schematically illustrating a state in which the sensing device according to the embodiment is installed in a vehicle steering structure.

A sensing device 100 according to an embodiment of the present invention may be installed in a steering structure 20 of a vehicle, but the present invention is not limited thereto. The sensing device 100 according to the embodiment of the present invention is widely applicable to measuring displacement of a structure performing a linear movement.

Referring to FIGS. 1 and 2, the sensing device 100 may include a magnet 110, a collector 120, a first sensor 130, and a second sensor 140. In addition, the steering structure 20 of the vehicle may include a driving member 21 and a fixing member 22.

The driving member 21 may be linearly movable. Meanwhile, the fixing member 22 may be fixed in position. The driving member 21 and the fixing member 22 are connected so as to be movable relative to each other. The driving member 21 may be exemplified as a rack bar, and the fixing member 22 may be a rack housing surrounding one side of the rack bar, but the present invention is not limited thereto. Here, the driving member 21 may be coupled to the magnet 110, and the fixing member 22 may be coupled to the collector 120, the first sensor 130, and the second sensor 140.

The magnet 110 generates a magnetic field. The magnet 110 may include a first pole 111 and a second pole 112. Here, the first pole 111 may be an S-pole. In addition, the second pole 112 may be an N-pole. However, the present invention is not limited thereto, and the first pole 111 may be an N-pole and the second pole 112 may be an S-pole.

The magnet 110 may be linearly moved together with the driving member 21. In this case, a moving direction of the magnet 110 may be perpendicular to an arrangement direction of the first pole 111 and the second pole 112. Here, a direction parallel to the arrangement direction of the first pole 111 and the second pole 112 is assumed to be a first direction, a direction parallel to the moving direction of the magnet 110 is assumed to be a second direction, and a direction perpendicular to the first and second directions is assumed to be a third direction.

The collector 120 is disposed to correspond to a path along which the magnet 110 moves. A gap 120G may be formed in the collector 120. The magnet 110 is disposed to be movable in the gap 120G. The magnet 110 may move in the gap 120G to generate a magnetic field, and the collector 120 may collect the magnetic field generated by the magnet 110. Here, the collector 120 may include a first leg part 121, a second leg part 122, and a third leg part 123.

The first sensor 130 and the second sensor 140 may detect a strength of the magnetic field, i.e., a magnetic flux density, collected by the collector 120. The first sensor 130 and the second sensor 140 may detect a position of the magnet 110 on the basis of a difference between a magnetic flux density detected using the collector 120 and a magnetic flux density detected using the collector 120. Here, the first sensor 130 and the second sensor 140 may be disposed opposite to each other with respect to the magnet. The first sensor 130 and the second sensor 140 may be disposed on the collector 120.

FIG. 3 is a side view illustrating a sensing device according to one embodiment, and FIG. 4 is a plan view illustrating the sensing device according to one embodiment.

Referring to FIG. 3, a magnet 110 may be conveniently divided into a first part P1 and a second part P2. The first part P1 and the second part P2 may be arranged in the third direction. The first part P1 and the second part P2 may have the same size. The division is merely for clearly describing the embodiment of the present invention, and the first part P1 and the second part P2 may be integrated together. In this case, the first part P1 is assumed to be an upper end portion and the second part P2 is assumed to be a lower end portion.

A collector 120 may include a first leg part 121, a second leg part 122, and a third leg part 123A. The first leg part 121 may be disposed around the periphery of the first part P1. In addition, the second leg part 122 may be disposed around the periphery of the second part P2. The third leg part 123A may be disposed such that one side faces the first leg part 121 and the other side faces the second leg part 122. In addition, the first leg part 121 and the second leg part 122 may be spaced apart from each other in the third direction. The first leg part 121 and the second leg part 122 may be twisted in position. In this case, a shortest distance D1 between the first leg part 121 and the second leg part 122 may be less than a length ($L_m$) of the magnet 110. Here, the length of the magnet 110 refers to a length between both ends of the magnet 110 disposed in the third direction.

The third leg part 123A may be disposed to have a predetermined inclination angle ∠a with respect to the second direction.

Referring to FIG. 4, the first leg part 121 and the third leg part 123A may be spaced apart from each other in the first direction. In addition, the second leg part 122 and the third leg part 123A may be spaced apart from each other in the first direction. At this time, a portion of the magnet 110 is disposed between the first leg part 121 and the second leg part 122, and another portion thereof may be disposed between the second leg part 122 and the third leg part 123A. Here, the first leg part 121 may include a region away from the magnet 110 as it moves toward one side of the second direction. In addition, the second leg part 122 may include a region away from the magnet 110 as it moves toward a side opposite to the one side in the second direction. Meanwhile, the third leg part 123A may have a constant distance from the magnet 110 regardless of the position in the second direction.

A distance D2 between the first leg part 121 and the third leg part 123A may be greater than a width $W_m$ of the magnet 110. Here, the width of the magnet 110 refers to the length between both ends of the magnet 110 disposed in the first direction. Here, the distance D2 between the first leg part 121 and the third leg part 123A may be variable depending on the positions in the second direction. A distance D3 between the second leg part 122 and the third leg part 123A may be greater than the width $W_m$ of the magnet 110. Similarly, the distance D3 between the second leg part 122 and the third leg part 123A may be variable depending on the positions in the second direction.

The first leg part 121 and the second leg part 122 may be disposed to face the second pole 112. In addition, the third leg part 123A may be disposed to face the first pole 111. A first sensor 130 may be disposed between the first leg part 121 and the third leg part 123A. The first sensor 130 may be coupled to an end portion of the third leg part 123A. In addition, a second sensor 140 may be disposed between the second leg part 122 and the third leg part 123A. The second sensor 140 may be coupled to an end portion of the second leg part 122. In such a sensing device, a position of the magnet 110 may be determined from a difference between a position of the magnet 110 detected using the first leg part 121 and the third leg part 123A and a position of the magnet 110 detected using the second leg part 122 and the third leg part 123A. With this structure, the present invention is able to share the collector that collects magnetic fields of a plurality of sensors. Accordingly, the number of components can be reduced and manufacturing costs can be reduced.

FIG. 5 is a side view illustrating a sensing device according to another embodiment, and FIG. 6 is an enlarged view of region A of FIG. 5. The present embodiment has substantially the same sensing device as that shown in FIG. 3 except for the shape of the third leg part. Accordingly, the same components as those in FIG. 3 are given the same reference numerals and repeated descriptions thereof will be omitted.

Referring to FIG. 5, a third leg part 123B may have a thickness different from those of a first leg part 121 and a second leg part 122. Here, the thickness of the leg part refers to a length between both ends of the leg part disposed in the third direction. The thickness of the third leg part 123B may be greater than the thickness of each of the first leg part 121 and the second leg part 122.

Referring to FIG. 6, a thickness $T_B$ of the third leg part 123B may be less than a shortest distance D4 between the first leg part 121 and the second leg part 122. At this time, the third leg part 123B may be disposed to have a predetermined inclination angle ∠b with respect to the second direction. Here, the inclination angle ∠b of the third leg part 123B described with reference to FIG. 6 may be less than the inclination angle ∠a of the third leg part 123A described with reference to FIG. 3. Meanwhile, although different from that shown in the drawing, the thickness $T_B$ of the third leg part 123B may be greater than the shortest distance D4 between the first leg part 121 and the second leg part 122. In this case, the third leg part 123B may be disposed parallel to the second direction.

FIG. 7 is a side view illustrating a sensing device according to still another embodiment, and FIG. 8 is a side view illustrating a third leg part and a magnet shown in FIG. 7. The present embodiment has substantially the same sensing device as that shown in FIG. 3 except for the shape of the third leg part. Accordingly, the same components as those in FIG. 3 are given the same reference numerals and repeated descriptions thereof will be omitted.

Referring to FIG. 7, a third leg part 123C may include a first part 1231, a second part 1232, and a third part 1233. The first part 1231, the second part 1232, and the third part 1233 may be integrated together. The first part 1231, the second part 1232, and the third part 1233 may be formed by bending a single rod member.

The first part 1231 may be disposed to face a first leg part 121. The first part 1231 may be disposed parallel to the first leg part 121. In this case, a first sensor 130 may be disposed between the first part 1231 and the first leg part 121. The first sensor 130 may be coupled to any one selected from the first part 1231 and the first leg part 121.

The second part 1232 may be disposed to face a second leg part 122. The second part 1232 may be disposed parallel to the second leg part 122. In this case, a second sensor 140 may be disposed between the second leg part 122 and the second part 1232. The second sensor 140 may be coupled to any one selected from the second part 1232 and the second leg part 122.

The third part 1233 may connect the first part 1231 and the second part 1232. One end of the third part 1233 may extend from the first part 1231, and the other end thereof may extend from the second part. Here, the third part 1233 may be disposed in the center of the third leg part 123C.

Referring to FIG. 8, a length of the third part 1233 in the second direction may be less than a moving length of the magnet 110. In addition, the length of the third part 1233 in the second direction may be greater than a thickness T3 of the third part 1233. Here, the thickness of the third part 1233 refers to a length between both ends of the third part 1233 disposed in the third direction. In this case, the third part 1233 may be disposed to have a predetermined inclination angle ∠c with respect to the second direction. The inclination angle ∠c of the third part 1233 of the sensing device according to the present embodiment may be greater than the inclination angle ∠a of the third leg part 123A of the sensing device shown in FIG. 3. Meanwhile, the length of the third part 1233 in the second direction may be equal to the thickness T3 of the third part 1233. In this case, the third part 1233 may be disposed to be perpendicular to the second direction.

FIG. 9 is a plan view illustrating a path along which the magnet moves in the sensing device according to one embodiment.

Referring to FIG. 9, the magnet 110 moves linearly in the second direction. At this time, the magnet 110 may start to move with an intermediate point C between the first sensor 130 and the second sensor 140 as an initial position. A position of the magnet 110 may be determined from a difference between a position of the magnet detected using the first leg part 121 and the third leg part 123 and a position of the magnet detected using the second leg part 122 and the third leg part 123.

The magnet 110 may move between a first position S1 and a second position S2. The first position S1 and the second position S2 are spaced apart from each other in the second direction. The first position S1 is disposed closest to the first sensor 130. In this case, the first position S1 is spaced apart from the first sensor 130 in the second direction by a predetermined distance. In addition, the second position S2 is disposed closest to the second sensor 140. The second position S2 is spaced apart from the second sensor 140 in the second direction by a predetermined distance. At this time, a distance between the first leg part 121 and the third leg part 123 may decrease from the initial position to the first position S1. In addition, a distance between the second leg part 122 and the third leg part 123 may decrease from the first position S1 to the second position S2.

At the first position S1, a first point of the magnet 110 has the shortest distance from the third leg part 123. Here, the first point of the magnet 110 and the third leg part 123 are spaced apart from each other by a first distance. In addition, at the second position S2, a second point of the magnet 110 has the shortest distance from the third leg part 123. Here, the second point of the magnet 110 and the third leg part 123 are spaced apart from each other by a second distance. In this case, the first distance and the second distance may be the same. In addition, the first point and the second point may be different from each other. That is, the shortest distance between the magnet 110 and the third leg part 123 may be constant regardless of the position of the magnet 110 in the second direction. However, the point of the magnet 110 forming the shortest distance from the third leg part 123 may vary according to the position of the magnet 110 in the second direction.

FIG. 10 is a plan view illustrating the flow of a magnetic field generated by the magnet in the sensing device according to one embodiment.

Referring to FIG. 10, in the sensing device according to the present invention, magnetic fields flowing in different directions are generated as the magnet 110 moves. At this time, a first magnetic field M1 and a second magnetic field M2 may be generated in the collector 120.

The first magnetic field M1 may be moved along the first leg part 121 from the position of the magnet 110 toward the first sensor 130. In addition, the first magnetic field M1 may pass through the first sensor 130 and may be moved to the third leg part 123. The first magnetic field M1 may be moved along the third leg part 123 to the position of the magnet 110.

The second magnetic field M2 may be moved along the second leg part 122 from the position of the magnet 110 toward the second sensor 140. In addition, the second magnetic field M2 may pass through the second sensor 140 and may be moved toward the third leg part 123. The second magnetic field M2 may be moved along the third leg part 123 to the position of the magnet 110. The first magnetic field M1 and the second magnetic field M2 may be generated in opposite directions from the position of the magnet 110.

FIG. 11 is a graph illustrating a result of measuring a magnetic flux density using the sensing device according to one embodiment in a state in which an external magnetic field is not introduced, and FIG. 12 is a graph illustrating a result of measuring a magnetic flux density using the sensing device according to one embodiment in a state in which an external magnetic field is introduced.

On the graph, a vertical axis represents the magnetic flux density, and the horizontal axis represents a magnet displacement in the first direction. Here, a magnetic flux density detected by using a first collector is expressed as a first flux F1, and a magnetic flux density detected using a second collector is expressed as a second flux F2.

Referring to FIG. 11, it can be seen that, in the sensing device, the magnetic flux density of the first flux F1 changes according to the magnet displacement, and the second flux F2 changes in inverse proportion to the changed value of the first flux F1. At this time, the first flux F1 and the second flux F2 may be represented by curves symmetrical with respect to a magnet displacement of 0. Accordingly, it can be seen that a difference (F1−F2) between the first flux F1 and the second flux F2 linearly decreases or increases according to the magnet displacement.

Meanwhile, referring to FIG. 12, it can be seen that, as the external magnetic field is introduced, both the first flux F1 and the second flux F2 are offset, but the difference (F1−F2) between the first flux F1 and the second flux F2 is not affected. The sensing device according to the embodiment may maintain linearity of a magnetic flux even when an external magnetic field is applied, and by improving the linearity of the magnetic flux, the magnet displacement can be detected more accurately.

FIG. 13 is a perspective view illustrating a sensing device according to an embodiment, FIG. 14 is a view schematically illustrating a state in which the sensing device according to the embodiment is installed in a vehicle steering structure, and FIG. 15 is an exploded perspective view illustrating the sensing device according to the embodiment.

A sensing device 210 according to an embodiment of the present invention may be installed in a steering structure 220 of a vehicle, but the present invention is not limited thereto. The sensing device 210 according to the embodiment of the present invention is broadly applicable to measuring displacement of a structure performing a linear movement.

Referring to FIGS. 13 to 15, the sensing device 210 according to the present invention may include a housing 2100, a magnet 2200, a stator 2300, a collector 2400, a Hall sensor 2500, and a printed circuit board 2600.

The sensing device 210 may be connected to the steering structure 220 of the vehicle. The steering structure 220 of the vehicle may include a driving member 221 and a fixing member 222. The driving member 221 and the fixing member 222 may be disposed between two wheels 223. The driving member 221 may be linearly movable. The driving member 221 may reciprocate between the two wheels 223. Meanwhile, the fixing member 222 may be disposed in a fixed position between the two wheels 223. Here, the driving member 221 and the fixing member 222 may be connected to each other so as to be relatively movable. The driving member 221 may be exemplified as a rack bar, and the fixing member 222 may be a rack housing disposed in the rack bar, but the present invention is not limited thereto.

The housing 2100 may form an exterior of the sensing device 210. The housing 2100 may be coupled to the fixing member 222. The housing 2100 may include a first housing 2110 and a second housing 2120. In addition, the magnet 2200, the stator 2300, the collector 2400, and the Hall sensor 2500 may be disposed in the first housing 2110. In addition, the printed circuit board 2600 may be disposed in the second housing 2120.

The magnet 2200 may be coupled to the driving member 221. In addition, the stator 2300, the Hall sensor 2500, and the housing 2100 may be coupled to the fixing member 222. The magnet 2200 generates a magnetic field. The magnet 2200 may include a first pole and a second pole. Here, the first pole may be an S-pole. In addition, the second pole may be an N-pole. The magnet 2200 may be disposed on the driving member 221. The magnet 2200 may be linearly moved according to the movement of the driving member 221. The magnet 2200 may reciprocate between the two wheels 223.

The stator 2300 may be disposed in the housing 2100. In addition, the stator 2300 may be disposed on a path along which the magnet 2200 moves.

The collector 2400 may collect a flux of the stator 2300. The collector 2400 may be disposed adjacent to the stator 2300. Here, the collector 2400 may be formed of a metal material, but the present invention is not limited thereto.

The Hall sensor 2500 may be disposed on the collector 2400. In addition, the Hall sensor 2500 may be disposed to face the magnet 2200. The Hall sensor 2500 may detect a change in magnetic charge. The Hall sensor 2500 may be a Hall integrated circuit (IC).

The Hall sensor 2500 may be mounted on the printed circuit board 2600. The printed circuit board 2600 may be a printed circuit board (PCB).

FIG. 16 is a front view illustrating a state in which the housing is removed from the sensing device according to one embodiment, and FIG. 17 is a perspective view illustrating the stator of the sensing device according to one embodiment.

Referring to FIGS. 16 and 17, the magnet 2200 may include a first magnet 2210 and a second magnet 2220.

The first magnet 2210 and the second magnet 2220 may be disposed in the third direction. Here, the first magnet 2210 and the second magnet 2220 may have the same size, but the present invention is not limited thereto. The shapes and sizes of the first magnet 2210 and the second magnet 2220 may be variously designed and modified.

The first magnet 2210 and the second magnet 2220 may be disposed in different stators 2300. In this case, the first magnet 2210 and the second magnet 2220 may reciprocate and linearly move in the stators 2300, respectively. Moving speeds of the first magnet 2210 and the second magnet 2220 may be the same. The first magnet 2210 and the second magnet 2220 may be coupled by a magnet holder (not shown). The first magnet 2210 and the second magnet 2220 may overlap in the third direction.

The stator 2300 may be a rectangular-shaped member whose length is longer than its width. The stator 2300 may be disposed along a moving direction of the magnet 2200. The stator 2300 may include a facing surface facing the magnet 2200. Here, as the magnet 2200 moves, the facing surface of the stator 2300 varies in area so that an amount of magnetization is changed.

The stator 2300 may include a first part 2301, a second part 2302, and a third part 2303.

The first part 2301 and the second part 2302 may be spaced apart from each other in the third direction. The first part 2301 and the second part 2302 may be disposed in parallel. In addition, a space may be formed between the first part 2301 and the second part 2302 for the magnet 2200 to be disposed.

The first part 2301 and the second part 2302 may each have a width larger than a thickness. In the present specification, the thickness refers to a length in the first direction, and the width refers to a length in the second direction. The first part 2301 may have a first width. The first width refers to a length of the first part 2301 in the second direction. The first width may decrease in the first direction. In this case, a ratio at which the first width decreases in the first direction may be the same as a ratio at which a second width decreases in the first direction.

The first part 2301 may include a first inclined portion 2301A. The first inclined portion 2301A may be disposed in an end portion of the first part 2301. The first inclined portion 2301A may be disposed to be inclined at a predetermined angle with respect to the first direction. The first inclined portion 2301A may be closer to the third part 2303 in the first direction.

The second part 2302 may have the second width. The second width refers to a length of the second part 2302 in the second direction. The second width may increase in the first direction. The second part 2302 may include a second inclined portion 2302A. The second inclined portion 2302A may be disposed in an end portion of the second part 2302. The second inclined portion 2302A may be disposed to be inclined at a predetermined angle with respect to the first direction. In this case, an angle at which the second inclined portion 2302A is inclined and an angle at which the first inclined portion 2301A is inclined may be opposite in direction. The second inclined portion 2302A may be away from the third part 2303 as it moves in the first direction.

The third part 2303 may connect the first part 2301 and the second part 2302. The third part 2303 may be disposed perpendicular to each of the first part 2301 and the second part 2302. In this case, the first part 2301 may be bent and extend from one end portion of the first part 2301. In addition, the second part 2302 may be bent and extend from the other end portion of the third part 2303.

FIG. 18 is a perspective view illustrating a first stator and a second stator of the sensing device according to one embodiment, FIG. 19 is a front view illustrating the first stator and the second stator of the sensing device according to one embodiment, and FIG. 20 is a side view illustrating the magnet, the stator, and the Hall sensor of the sensing device according to one embodiment.

Referring to FIGS. 18 to 20, the stator 2300 may include a first stator 2310 and a second stator 2320.

The first stator 2310 and the second stator 2320 may be disposed to be spaced apart from each other in the third direction. The first stator 2310 and the second stator 2320 may be members of the same shape. However, the present invention is not limited thereto. The first stator 2310 and the second stator 2320 may be the same shape as the stator 2300 of FIG. 18.

The first stator 2310 may include a 1Ath part 2311, a 2Ath part 2312, and a 3Ath part 2313. Here, the 1Ath part 2311, the 2Ath part 2312, and the 3Ath part 2313 may have the same shapes as the first part 2301, the second part 2302, and the third part 2303 of the stator 2300, respectively. In addition, the second stator 2320 may include a 1Bth part 2321, a 2Bth part 2322, and a 3Bth part 2323. Similarly, the 1Bth part 2321, the 2Bth part 2322, and the 3Bth part 2323 may have the same shapes as the first part 2301, the second part 2302, and the third part 2303 of the stator 2300, respectively.

The first stator 2310 may include a first gap G1. The first gap G1 may be disposed between the 1Ath part 2311 and the 2Ath part 2312. In addition, the first gap G1 may be open toward an opposite side of the 3Ath part 2313. The first magnet 2210 may be disposed in the first gap G1. Here, a distance $D_G$ between the 1Ath part 2311 and the 2Ath part 2312 may be greater than a width of the first magnet 2210 in the third direction.

The second stator 2320 may include a second gap G2. The second gap G2 may be disposed between the 1Bth part 2321 and the 2Bth part 2322. The second gap G2 may be open toward an opposite side of the third 3B part 2323. The second magnet 2220 may be disposed in the second gap G2. Here, a distance between the 1Bth part 2321 and the 2Bth part 2322 may be equal to the distance $D_G$ between the 1Ath part 2311 and the 3Ath part 2313. In addition, the distance between the 1Bth part 2321 and the 2Bth part 2322 may be greater than a width of the second magnet 2220 in the third direction.

In one end portion of the first stator 2310, a first width of the 1Ath part 2311 and a second width of the 2Ath part 2312 may be different from each other. In this case, the first width may be greater than the second width. In addition, in the one end portion of the first stator 2310, the first width may have a maximum value $w_{max}$ and the second width may have a minimum value $w_{min}$. In contrast, in the other end portion of the first stator 2310, the first width may have the minimum value, and the second width may have the maximum value. The description of the first stator 2310 may be equally applied to the second stator 2320.

The magnet 2200 may be linearly moved along the stator 2300. Here, the stator 2300 may include a first end portion 2300S1 and a second end portion 2300S2 disposed in the first direction. The magnet 2200 may reciprocate between the first end portion 2300S1 and the second end portion 2300S2.

At the first end portion 2300S1, the first width of the first part 2301 may be greater than the second width of the second part 2302. In this case, the first width of the first part 2301 at the first end portion 2300S1 may have the maximum value $w_{max}$. Meanwhile, the second width of the second part 2302 at the first end portion 2300S1 may have the minimum value $w_{min}$. In addition, at the second end portion 2300S2, the second width of the second part 2302 may be greater than the first width of the first part 2301.

As the magnet 2200 moves in the first direction in the sensing device, an area facing the first part 2301 may gradually decrease. Meanwhile, as the magnet 2200 moves in the first direction, an area facing the second part 2302 may gradually increase. In this case, an area at which the magnet 2200 and the first part 2301 face each other and an area at which the magnet 2200 and the second part 2302 face each other may be constant in magnitude regardless of the positions in the first direction.

FIG. 21 is a front view illustrating the magnet, the stator, and the Hall sensor of the sensing device according to one embodiment.

Referring to FIG. 21, the first magnet 2210 and the second magnet 2220 may be magnetized. Magnetization directions of the first magnet 2210 and the second magnet 2220 may be oriented in arrow directions. The magnetization direction of the first magnet 2210 may face the second magnet 2220. Meanwhile, the magnetization direction of the second magnet 2220 may face the first magnet 2210.

The first magnet 2210 and the second magnet 2220 may each be disposed inside the first stator 2310 or the second stator 2320. In this case, one surface of each of the first magnet 2210 and the second magnet 2220 may face the first stator 2310 or the second stator 2320. Meanwhile, other surface of each of the first magnet 2210 and the second magnet 2220 may not face the first stator 2310 or the second stator 2320. According to the embodiment, the first magnet 2210 may include a first cross-section 2210A that does not face the first stator 2310. In addition, the second magnet 2220 may include a second cross-section 2220A that does not face the second stator 2320.

The collector 2400 may be disposed between the first magnet 2210 and the second magnet 2220 with respect to the third direction. Here, a distance D between the first magnet 2210 and the second magnet 2220 may be greater than a width of the collector 2400 in the third direction.

FIG. 22 is a view illustrating the flow of fluxes of the first magnet and the second magnet disposed in the first end portion of the stator.

Referring to FIG. 22, the first magnet 2210 may be disposed in the first end portion 2300S1 of the first stator 2310, and the second magnet 2220 may be disposed in the first end portion 2300S2 of the second stator 2320. The first magnet 2210 and the second magnet 2220 may overlap in the third direction regardless of the positions in the first direction. That is, the first magnet 2210 and the second magnet 2220 may move at the same speed.

Fluxes generated by the first magnet 2210 and the second magnet 2220 may be induced along an arrow shown in FIG. 22. The flux generated by the second magnet 2220 may be induced to the second stator 2320. At this time, the flux induced to the second stator 2320 may be induced to a second collector 2420. In addition, the flux induced to the second collector 2420 may pass through the Hall sensor 2500 to be induced to a first collector 2410. In addition, the flux induced to the first collector 2410 may be induced to the first stator 2310 and flow in one direction. Here, the flux induced to the first stator 2310 may flow toward an opposite side of the second magnet 2220.

FIG. 23 is a view illustrating the flow of fluxes of the first magnet and the second magnet disposed in a central portion of the stator.

Referring to FIG. 23, the first magnet 2210 may be disposed in the central portion of the first stator 2310. In addition, the second magnet 2220 may be disposed in the central portion of the second stator 2320. Here, the central portion may mean a region between the first end portion 2300S1 and the second end portion 2300S2 of the stator.

Fluxes generated by the first magnet 2210 and the second magnet 2220 may be induced along arrows shown in FIG. 23. The flux generated by the first magnet 2210 may be induced to the first stator 2310. In addition, the flux generated by the second magnet 2220 may be induced to the second stator 2320. Here, a direction of the flux induced to the first stator 2310 and a direction of the flux induced to the second stator 2320 may be opposite to each other. For example, the flux induced to the first stator 2310 may flow counterclockwise. In addition, the flux induced to the second stator 2320 may flow clockwise.

FIG. 24 is a view illustrating the flow of fluxes of the first magnet and the second magnet disposed in the second end portion of the stator.

Referring to FIG. 24, the first magnet 2210 may be disposed in the second end portion 2300S2 of the first stator 2310, and the second magnet 2220 may be disposed in the second end portion 2300S2 of the second stator 2320.

Fluxes generated by the first magnet 2210 and the second magnet 2220 may be induced along an arrow shown in FIG. 24. The flux generated by the first magnet 2210 may be induced to the first stator 2310. In addition, the flux induced to the first stator 2310 may be induced to the first collector 2410. The flux induced to the first collector 2410 may pass through the Hall sensor 2500 to be induced to the second collector 2420. The flux induced to the second collector 2420 may be induced to the second stator 2320 and flow in one direction. At this time, the flux induced to the second stator 2320 may flow toward an opposite side of the first magnet 2210.

FIG. 25 is a graph illustrating a change amount in Gauss for each position of the magnet of the sensing device according to one embodiment.

Referring to FIGS. 22 to 25, a change amount in Gauss applied to the Hall sensor 2500 may be changed according to the distance between the magnets 2210 and 2220. Here, the distance refers to a distance in which the magnets 2210 and 2220 move in the first direction with respect to an initial position 0. In addition, at the initial position 0, the magnets 2210 and 2220 may have the same distance from the first end portion 2300S1 and from the second end portion 2300S2.

The magnets 2210 and 2220 may reciprocate between the first end portion 2300S1 and the second end portion 2300S2. A first distance A refers to a distance from the initial position 0 to the first end portion 2300S1 in the first direction, and a second distance B refers to a distance from the initial position 0 to the second end portion 2300S2 in first direction. The first distance A and the second distance B may be the same in magnitude. The first distance A and the second distance B may each be the maximum moving distance of the magnets 2210 and 2220.

Gauss applied to the Hall sensor 2500 may be linearly increased while the magnets 2210 and 2220 move from the initial position 0 to the first distance A. On the other hand, Gauss applied to the Hall sensor 2500 may be linearly reduced while the magnets 2210 and 2220 move from the initial position 0 to the second distance B. At this time, the rate of change of Gauss may be constant.

FIG. 26 is a bottom view illustrating the first housing of the sensing device according to one embodiment, and FIG. 27 is a perspective view illustrating a state in which the first magnet, the second magnet, and a magnet holder of the sensing device according to one embodiment are coupled.

Referring to FIG. 26, the first housing 2110 may be a rectangular-shaped member in which a length in the first direction is longer than a width in the third direction. The first housing 2110 may accommodate the stator, the collector, and the Hall sensor. According to the embodiment, the first housing 2110 may be coupled to the stator, the collector, and the Hall sensor by insert molding.

The first housing 2110 may include a first accommodation part 2111 and a second accommodation part 2112.

The first accommodation part 2111 may extend long in the first direction. In addition, the second accommodation part 2112 may be spaced apart from the first accommodation part in the third direction. The second accommodation part 2112 may have a length in the first direction and a width in the third direction, which are the same as those of the first accommodation part 2111. Here, the first stator 2310 may be disposed in the first accommodation part 2111. In addition, the second stator 2320 may be disposed in the second accommodation part 2112.

The first housing 2110 may include a first groove 2110G. The first groove 2110G may be disposed between the first accommodation part 2111 and the second accommodation part 2112. The first groove 2110G may have a length in the first direction which is longer than a width in the third direction. A magnet holder 2700 may be coupled to the first groove 2110G.

Referring to FIG. 27, the magnet holder 2700 may include a first member 2710 and a first protrusion 2720.

The first member 2710 may be coupled to the first magnet 2210 and the second magnet 2220. Here, the first member 2710 may include a 1Ath groove 2701 and a 2Ath groove 2702. The first magnet 2210 may be disposed in the 1Ath groove 2701. In addition, the second magnet 2220 may be disposed in the 2Ath groove 2702.

The first protrusion 2720 may be formed to protrude from the first member 2710. The first protrusion 2720 may be disposed between the first magnet 2210 and the second magnet 2220. At this time, the first protrusion 2720 may be disposed in the first groove 2110G. The first protrusion 2720 may be slidably coupled to the first groove 2110G in the first direction.

FIG. 28 is a perspective view illustrating a state in which the second housing of the sensing device according to one embodiment is coupled to the printed circuit board and the Hall sensor of the sensing device.

Referring to FIG. 28, the second housing 2120 may include a third accommodation part 2121. At this time, the second housing 2120 may be disposed on the first housing 2110 (of FIG. 26). In addition, the third accommodation part 2121 may be open toward the first housing 2110. The printed circuit board 2600 may be disposed in the third accommodation part 2121. The Hall sensor 2500 may be mounted on the printed circuit board 2600. In this case, a portion of the Hall sensor 2500 may be disposed in the first housing 2110 (of FIG. 26).

FIG. 29 is a perspective view illustrating the collector of the sensing device according to one embodiment, and FIG. 30 is a plan view illustrating the collector of the sensing device according to one embodiment.

Referring to FIGS. 29 and 30, the collector 2400 may include the first collector 2410 and the second collector 2420. The first collector 2410 and the second collector 2420 may be disposed in the third direction. According to the embodiment, the first collector 2410 and the second collector 2420 may have different shapes.

The first collector 2410 may include a first body 2411 and one or more first legs 2412 and 2413.

The first body 2411 may be connected to the stator 2300. The first body 2411 may be in contact with the first stator 2310. The first body 2411 may be formed long in the first direction. In addition, the first body 2411 may have a width in the second direction larger than a thickness in the third direction. The number of the first legs 2412 and 2413 may be the same as the number of the Hall sensors 2500. A plurality of first legs 2412 and 2413 may be provided. The first legs 2412 and 2413 may include a 1Ath leg 2412 and a 1Bth leg 2413. The 1Ath leg 2412 and the 1Bth leg 2413 may be disposed to be spaced apart from each other in the first direction. The 1Ath leg 2412 and the 1Bth leg 2413 may have different shapes from each other.

The second collector 2420 may include a second body 2421 and one or more second legs 2422 and 2423.

The second body 2421 may be connected to the stator 2300. The second body 2421 may be in contact with the second stator 2320. The second body 2421 and the first body 2411 may be disposed in the third direction. The second body 2421 may be disposed parallel to the first body 2411. In addition, the second body 2421 may have the same shape as the first body 2411. The number of the second legs 2422 and 2423 may be the same as the number of the first legs 2412 and 2413. A plurality of second legs 2422 and 2423 may be provided. The second legs 2422 and 2423 may include a 2Ath leg 2422 and a 2Bth leg 2423. The 2Ath leg 2422 and the 2Bth leg 2423 may be disposed to be spaced apart from each other in the first direction. The 2Ath leg 2422 and the 2Bth leg 2423 may have different shapes from each other. The Hall sensor 2500 may be disposed between the 1Ath leg 2412 and the 2Ath leg 2422 or between the 1Bth leg 2413 and the 2Bth leg 2423.

The 1Ath leg 2412 and the 2Ath leg 2422 may not overlap at least partially in the third direction.

The 1Ath leg 2412 may include a 1Ath support part 24121, a 1Ath extension part 24122, and a 1Ath bent part 24123. The 1Ath support part 4121, the 1Ath extension part 4122, and the 1Ath bent part 4123 may be an integral member. In addition, the 1Ath support part 4121, the 1Ath extension part 4122, and the 1Ath bent part 4123 may be bent and disposed at a predetermined angle.

The 1Ath support part 4121 may be disposed on the first body 2411. The 1Ath support part 4121 may extend in a longitudinal direction of the first body 2411. The 1Ath extension part 4122 may extend from the 1Ath support part 4121. The 1Ath extension part 4122 may extend toward the second collector 2420. In addition, the 1Ath bent part 4123 may extend from the 1Ath extension part 4122. The 1Ath bent part 4123 may extend in the first direction. The 1Ath bent part 4123 may be disposed between the first body 2411 and the second body 2421 with respect to the third direction. The 1Ath bent part 4123 may be disposed closer to the second body 2421 than the first body 2411.

The 2Ath leg 2422 may include a 2Ath support part 24221, a 2Ath extension part 24222, and a 2Ath bent part 24223. The 2Ath support part 4221, the 2Ath extension part 4222, and the 2Ath bent part 4223 may be an integral member. The 2Ath support part 4221, the 2Ath extension part 4222, and the 2Ath bent part 4223 may be bent and disposed at a predetermined angle. The 2Ath support part 4221 may be disposed on the second body 2421. The 2Ath support part 4221 may extend in a longitudinal direction of the second body 2421. In addition, the 2Ath extension part 4222 may extend from the 2Ath support part 4221. The 2Ath extension part 4222 may extend toward the first collector 2410. In addition, the 2Ath bent part 4223 may extend from the 2Ath extension part 4222. The 2Ath bent part 4223 may extend in the first direction. The 2Ath bent part 4223 may be disposed between the first body 2411 and the second body 2421 with respect to the third direction. The 2Ath bent part 4223 may be disposed closer to the first body 2411 than the second body 2421.

The 1Ath support part 4121 and the 2Ath support part 4221 may not overlap in the third direction. In addition, the 1Ath extension part 4122 and 2Ath extension part 4222 may not overlap in the third direction. In addition, the 1Ath bent part 4123 and the 2Ath bent part 4223 may overlap at least partially in the third direction. The 1Ath bent part 4123 and the 2Ath bent part 4223 may be spaced apart from each other in the third direction. Here, a spacing distance D12 between the 1Ath bent part 4123 and the 2Ath bent part 4223 may be less than a spacing distance between the first collector 2410 and the second collector 2420. The Hall sensor 2500 may be disposed between the 1Ath bent part 4123 and the 2Ath bent part 4223.

By asymmetrically arranging the 1Ath leg 2412 and the 2Ath leg 2422, the flow of an external magnetic field may be disturbed. Accordingly, the Hall sensor 2500 disposed between the 1Ath leg 2412 and the 2Ath leg 2422 is advantageous for compensation for external resistance.

The 1Bth leg 2413 and the 2Bth leg 2423 may overlap in the third direction.

The 1Bth leg 2413 may include a 1Bth support part 24131, a 1Bth extension part 24132, and a 1Bth bent part 24133. The 1Bth support part 24131, the 1Bth extension part 24132, and the 1Bth bent part 24133 may be an integral member. In addition, the 1Bth support part 24131, the 1Bth extension part 24132, and the 1Bth bent part 24133 may be bent and disposed at a predetermined angle. The 1Bth support part 24131 may be disposed on the first body 2411. In addition, the 1Bth extension part 24132 may extend from the 1Bth support part 24131. The 1Bth extension part 24132 may extend toward the second collector 2420. In addition, the 1Bth bent part 24133 may extend from the 1Bth extension part 24132. The 1Bth bent part 24133 may extend in the first direction. The 1Bth bent part 24133 may be disposed between the first body 2411 and the second body 2421 with respect to the third direction. The 1Bth bent part 24133 may be disposed closer to the first body 2411 than the second body 2421.

The 2Bth leg 2423 may include a 2Bth support part 24231, a 2Bth extension part 24232, and a 2Bth bent part 24233. The 2Bth support part 24231, the 2Bth extension part 24232, and the 2Bth bent part 24233 may be an integral member. In addition, the 2Bth support part 24231, the 2Bth extension part 24232, and the 2Bth bent part 24233 may be bent and disposed at a predetermined angle. The 2Bth support part 24231 may be disposed on the second body 2421. In addition, the 2Bth extension part 24232 may extend from the 2Bth support part 24231. The 2Bth extension part 24232 may extend toward the first collector 2410. In addition, the 2Bth bent part 24233 may extend from the 2Bth extension part 24232. The 2Bth bent part 24233 may extend in the first direction. The 2Bth bent part 24233 may be disposed between the first body 2411 and the second body 2421 with respect to the third direction. The 2Bth bent part 24233 may be disposed closer to the second body 2421 than the first body 2411.

At this time, the 1Bth support part 24131 and the 2Bth support part 24231 may overlap in the third direction. In addition, the 1Bth extension part 24132 and the 2Bth extension part 24232 may overlap in the third direction. At this time, the 1Bth bent part 24133 and the 2Bth bent part 24233 may overlap in the third direction. The 1Bth bent part 24133 and the 2Bth bent part 24233 may be spaced apart from each other in the third direction. A spacing distance D22 between the 1Bth bent part 24133 and the 2Bth bent part 24233 may be less than the spacing distance between the first collector 2410 and the second collector 2420. The Hall sensor 2500 may be disposed between the 1Bth bent part 24133 and the 2Bth bent part 24233.

FIG. 31 is an exploded perspective view illustrating a sensing device according to another embodiment, FIG. 32 is a front view illustrating a state in which a housing is removed from the sensing device according to another embodiment, FIG. 33 is a plan view illustrating the state in which the housing is removed from the sensing device according to another embodiment, and FIG. 34 is a perspective view illustrating a collector and a Hall sensor of the sensing device according to another embodiment.

The present embodiment has substantially the same sensing device as that shown in FIG. 15 except for the shape of the collector 2800. Accordingly, the same components as those in FIG. 15 are given the same reference numerals and repeated descriptions thereof will be omitted.

Referring to FIGS. 31 to 34, the collector 2800 may include a first collector 2810 and a second collector 2820.

The first collector 2810 and the second collector 2820 may be disposed in the third direction. According to the embodiment, the first collector 2810 and the second collector 2820 may be formed in the same shape.

The first collector 2810 may include a first body 2811 and one or more first legs 2812 and 2813.

The first body 2811 may be connected to a stator 2300. The first body 2811 may be in contact with a first stator 2310. The first body 2811 may be formed long in the first direction. In addition, the first body 2811 may have a width in the third direction larger than a thickness in the second direction. The number of the first legs 2812 and 2813 may be the same as the number of Hall sensors 2500. A plurality of first legs 2812 and 2813 may be provided. The first legs 2812 and 2813 may include a 1Ath leg 2812 and a 1Bth leg 2813. The 1Ath leg 2812 and the 1Bth leg 2813 may be disposed to be spaced apart from each other in the first direction. The 1Ath leg 2812 and the 1Bth leg 2813 may have the same shape.

The second collector 2820 may include a second body 2821 and one or more second legs 2822 and 2823.

The second body 2821 may be connected to the stator 2300. The second body 2821 may be in contact with a second stator 2320. The second body 2821 and the first body 2811 may be disposed in the third direction. The second body 2821 may be disposed parallel to the first body 2811. In addition, the second body 2821 may have the same shape as the first body 2811. The number of the second legs 2822 and 2823 may be the same as the number of the first legs 2812 and 2813. A plurality of second legs 2822 and 2823 may be provided. The second legs 2822 and 2823 may include a 2Ath leg 2822 and a 2Bth leg 2823. The 2Ath leg 2822 and the 2Bth leg 2823 may be disposed to be spaced apart from each other in the first direction. The 2Ath leg 2822 and the 2Bth leg 2823 may have the same shape. The Hall sensor 2500 may be disposed between the 1Ath leg 2812 and the 2Ath leg 2822 or between the 1Bth leg 2813 and the 2Bth leg 2823.

FIG. 35 is a plan view illustrating the collector and the Hall sensor of the sensing device according to another embodiment, and FIG. 36 is a front view illustrating the collector and the Hall sensor of the sensing device according to another embodiment.

Referring to FIGS. 35 and 36, the 1Ath leg 2812 and the 2Ath leg 2822 may overlap in the third direction. In addition, the 1Bth leg 2813 and the 2Bth leg 2823 may overlap in the third direction.

The 1Ath leg 2812 may include a 1Ath extension part 28121 and a 1Ath bent part 28122. The 1Ath extension part 28121 and the 1Ath bent part 28122 may be an integral member. The 1Ath extension part 28121 and the 1Ath bent part 28122 may be bent and disposed at a predetermined angle. The 1Ath extension part 28121 may extend from the first body 2811 toward the second collector 2820. In the 1Ath extension part 28121, a width of a portion connected to the first body 2811 may be greater than a width of an end portion facing the second collector 2820. The 1Ath bent part 28122 may extend from the 1Ath extension part 28121. The 1Ath bent part 28122 may extend in the second direction. The 1Ath bent part 28122 may be disposed between the first body 2811 and the second body 2821 with respect to the third direction. The 1Ath bent part 28122 may be disposed closer to the first body 2811 than the second body 2821.

The 2Ath leg 2822 may include a 2Ath extension part 28221 and a 2Ath bent part 28222. The 2Ath extension part 28221 and the 2Ath bent part 28222 may be an integral member. The 2Ath extension part 28221 and the 2Ath bent part 28222 may be bent and disposed at a predetermined angle. The 2Ath extension part 28221 may extend from the second body 2821 toward the first collector 2810. In the 2Ath extension part 28221, a width of a portion connected to the second body 2821 may be greater than a width of an end portion facing the first collector 2810. The 2Ath bent part 28222 may extend from the 2Ath extension part 28221. The 2Ath bent part 28222 may extend in the second direction. The 2Ath bent part 28222 may be disposed between the first body 2811 and the second body 2821 with respect to the third direction. The 2Ath bent part 28222 may be disposed closer to the second body 2821 than the first body 2811.

The 1Bth leg 2813 may include a 1Bth extension part 28131 and a 1Bth bent part 28132. In addition, the 2Bth leg 2823 may include a 2Bth extension part 28231 and a 2Bth bent part 28232. Here, since the 1Bth extension part 28131 and the 1Bth bent part 28132 have the same shapes as the 1Ath extension part 28121 and the 1Ath bent part 28122, respectively, a detailed description thereof will be omitted. In addition, since the 2Bth extension part 28231 and the 2Bth bent part 28232 have the same shapes as the 2Ath extension part 28221 and the 2Ath bent part 28222, respectively, a detailed description thereof will be omitted.

The 1Ath bent part 28122 and the 2Ath bent part 28222 may overlap in the third direction. In addition, the 1Ath bent part 28122 and the 2Ath bent part 28222 may be spaced apart from each other in the third direction. A spacing distance D24 between the 1Ath bent part 28122 and the 2Ath bent part 28222 may be less than a spacing distance between the first body 2811 and the second body 2821. In addition, the 1Bth bent part 28132 and the 2Bth bent part 28232 may overlap in the third direction. The 1Bth bent part 28132 and the 2Bth bent part 28232 may be spaced apart from each other in the third direction. A spacing distance D25 between the 1Bth bent part 28132 and the 2Bth bent part 28232 may be equal to the spacing distance D24 between the 1Ath bent part 28122 and the 2Ath bent part 28222.

End portions of the 1Ath bent part 28122, the 1Bth bent part 28132, the 1Ath bent part 28122, and the 2Ath bent part 28222 may be disposed at the same height H2. As used herein, the same height does not necessarily mean exactly the same height, but may allow a difference within an error range. In addition, the height H2 of the end portions of the 1Ath bent part 28122, the 1Bth bent part 28132, the 1Ath bent part 28122, and the 2Ath bent part 28222 may be different from a height H1 of one surface of the first body 2811 or the second body 2821.

FIG. 37 is a graph illustrating a change amount in Gauss measured by the first stator and the second stator of the sensing device according to one embodiment.

On the graph, a vertical axis represents a change amount in Gauss applied to the Hall sensor 2500 (in FIG. 16), and the horizontal axis represents moving distances of the first magnet and the second magnet. Here, the distances refer to distances in which the first magnet and the second magnet move in the first direction with respect to an initial position.

Here, a flux of the first stator 2310 collected through the first collector 2410 is expressed as a first flux T1, and a flux of the second stator 2320 collected through the second collector 2420 is expressed as a second flux T2.

Referring to FIG. 37, it can be seen that, in the sensing device, a magnetic flux density of the first flux T1 changes according to the displacement of the first magnet 2210, and the second flux T2 changes in inverse proportion to the changed value of the first flux T1. At this time, the first flux T1 and the second flux T2 may be represented by curves symmetrical with respect to a magnet displacement of 0.

Accordingly, it can be seen that a difference (T2−T1) between the second flux T2 and the first flux T1 linearly decreases or increases according to the position of the magnet in the first direction.

It can be seen that, as the external magnetic field is introduced, both the first flux T1 and the second flux T2 are offset, but the difference (T1−T2) between the first flux T1 and the second flux T2 is not affected. The sensing device according to the embodiment may maintain linearity of a magnetic flux even when an external magnetic field is applied, and by improving the linearity of the magnetic flux, the magnet displacement can be detected more accurately.

The sensing device according to the present invention can improve measurement accuracy by securing linearity of a Gauss value.

Although the above-described embodiments have been described with an example applied to a vehicle steering structure, but the present invention is not limited thereto. The present invention is related to a linear variable differential transformer (LVDT), which can be used in a variety of applications, including construction, facility management, home appliances, hydraulic machinery, measurement systems, aviation machinery, medical devices, production plants, inspection and test systems, mechanical devices, and the like.

The invention claimed is:

1. A sensing device comprising:
   a magnet;
   a stator disposed on a path along which the magnet moves; and
   a Hall sensor disposed to face the magnet, wherein the magnet moves in a first direction, the stator includes a first part and a second part facing each other with the magnet interposed therebetween, a width of the first part decreases in the first direction, and a width of the second part increases in the first direction.

2. The sensing device of claim 1, wherein a ratio at which the width of the first part decreases in the first direction is equal to a ratio at which the width of the second part increases in the first direction.

3. The sensing device of claim 1, wherein the magnet moves relative to the stator in the first direction.

4. The sensing device of claim 1, wherein the magnet is disposed between the first part and the second part.

5. The sensing device of claim 4, wherein a width of one end portion of the first part is equal to a width of the other end portion of the second part.

6. The sensing device of claim 4, wherein the stator includes a third part connecting the first part and the second part, and the third part may have a third width, which is a width in a third direction, greater than a width of the magnet in the third direction.

7. A sensing device comprising:
   a first magnet;
   a second magnet spaced apart from the first magnet;
   a first stator disposed on a path along which the first magnet moves;
   a second stator disposed on a path along which the second magnet moves; and
   a Hall sensor disposed to face the first magnet and the second magnet, wherein the first magnet and the second magnet move in a first direction, the first stator includes a 1Ath part and a 2Ath part facing the first magnet, the second stator includes a 1Bth part and a 2Bth part facing the second magnet, the 1Ath part and the 1Bth part decrease in width in the first direction, and the 2Ath part and the 2Bth part increase in width in the first direction.

8. The sensing device of claim 7, wherein a ratio at which the widths of the 1Ath part and the 1Bth part decrease in the first direction is equal to a ratio at which the widths of the 2Ath part and the 2Bth part increase in the second direction.

9. The sensing device of claim 8, wherein the first magnet and the second magnet move relative to the first stator and the second stator, respectively, in the first direction.

10. The sensing device of claim 7, wherein the first magnet is disposed between the 1Ath part and the 2Ath part, and the second magnet may be disposed between the 1Bth part and the 2Bth part.

11. The sensing device of claim 10, wherein the sensing device includes a first housing in which the first stator and the second stator are disposed, and a magnet holder on which the first magnet and the second magnet are disposed, wherein the first housing and the magnet holder is connected to be slidably movable in the first direction.

12. The sensing device of claim 11, wherein the first housing includes a first groove extending in the first direction, and the magnet holder includes a first protrusion disposed in the first groove to be slidably movable in the first direction.

13. The sensing device of claim 11, wherein the sensing device includes a printed circuit board (PCB) connected to the Hall sensor.

14. The sensing device of claim 13, wherein the sensing device includes a second housing coupled to the first housing, and the PCB may be disposed in the second housing.

15. The sensing device of claim 10, wherein the sensing device includes a first collector and a second collector disposed with the Hall sensor interposed therebetween, wherein the first collector and the second collector are disposed between the first stator and the second stator.

16. The sensing device of claim 15, wherein the first collector includes a first body and a first leg extending from the first body, the second collector includes a second body and a second leg extending from the second body, and the Hall sensor is disposed between the first leg and the second leg.

17. The sensing device of claim 16, wherein the first leg is disposed closer to the second body than the first body, and the second leg is disposed closer to the first body than the second body.

18. The sensing device of claim 17, wherein the first leg includes a first extension part connected to the first body and a first bent part bent from the first extension part, the second leg includes a second extension part connected to the second body and a second bent part extending from the second extension part, the first extension part and the second extension part do not overlap in the third direction, and the first bent part and the second bent part overlap in the third direction.

19. The sensing device of claim 16, wherein the first leg is disposed closer to the first body than the second body, and the second leg is disposed closer to the second body than the first body.

20. The sensing device of claim 19, wherein the first leg includes a first extension part connected to the first body and a first bent part bent from the first extension part, the second leg includes a second extension part connected to the second body and a second bent part extending from the second extension part, the first extension part and the second extension part overlap in the third direction, and the first bent part and the second bent part overlap in the third direction.

<p style="text-align:center">* * * * *</p>